US012625975B2

(12) United States Patent
Matsuo et al.

(10) Patent No.: US 12,625,975 B2
(45) Date of Patent: May 12, 2026

(54) SECURE SECRET SHARING STORAGE SYSTEM USING CLOUD SERVICE

(71) Applicants: PANASONIC CORPORATION, Osaka (JP); NATIONAL INSTITUTE OF INFORMATION AND COMMUNICATIONS TECHNOLOGY, Tokyo (JP)

(72) Inventors: Masakatsu Matsuo, Fukuoka (JP); Katsunori Kogata, Saitama (JP); Masahide Sasaki, Tokyo (JP); Mikio Fujiwara, Tokyo (JP)

(73) Assignees: PANASONIC HOLDINGS CORPORATION, Osaka (JP); NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 760 days.

(21) Appl. No.: 17/432,774

(22) PCT Filed: Jan. 21, 2020

(86) PCT No.: PCT/JP2020/001990
§ 371 (c)(1),
(2) Date: Aug. 20, 2021

(87) PCT Pub. No.: WO2020/170695
PCT Pub. Date: Aug. 27, 2020

(65) Prior Publication Data
US 2022/0147640 A1 May 12, 2022

(30) Foreign Application Priority Data
Feb. 22, 2019 (JP) ................................. 2019-031022

(51) Int. Cl.
*G06F 21/60* (2013.01)

(52) U.S. Cl.
CPC ................................. *G06F 21/602* (2013.01)

(58) Field of Classification Search
CPC ... H04L 9/085; H04L 2209/46; G06F 11/2092
See application file for complete search history.

(56) References Cited

U.S. PATENT DOCUMENTS 11,349,641 B2 * 5/2022 Furukawa ............. H04L 9/0822
11,748,494 B2 * 9/2023 Erden ................... H04L 9/0819
380/30

(Continued)

FOREIGN PATENT DOCUMENTS

JP      2008-097591      4/2008
JP      2008-199278      8/2008

(Continued)

OTHER PUBLICATIONS

Office Action from Japan Patent Office (JPO) in Japanese Patent Appl. No. 2019-031022, dated Apr. 11, 2023, together with an English language translation.

(Continued)

*Primary Examiner* — Hadi S Armouche
(74) *Attorney, Agent, or Firm* — Greenblum & Bernstein, P.L.C.

(57) ABSTRACT

A secret sharing storage system includes at least one user terminal, n units (n: an integer of 2 or more) of storage devices, and a main controller that is communicably connected to a random number generator. The main controller acquires a random number generated by the random number generator in a case of receiving original data sent from the user terminal, executes distributed processing on the original data by using the random number to generate n pieces of distributed data, and stores the n pieces of distributed data respectively in the corresponding n units of storage devices.

6 Claims, 18 Drawing Sheets

5

(56) References Cited

U.S. PATENT DOCUMENTS

| | | | |
|---|---|---|---|
| 2007/0260878 A1 | 11/2007 | Urivskiy et al. | |
| 2008/0232580 A1 | 9/2008 | Hosaka et al. | |
| 2012/0255030 A1 | 10/2012 | Matsuo | |
| 2014/0173270 A1* | 6/2014 | Matsuo | H04L 63/0428 |
| | | | 713/150 |
| 2017/0099138 A1* | 4/2017 | Albrecht | H04L 63/065 |
| 2018/0074889 A1* | 3/2018 | Resch | H04L 67/60 |
| 2018/0288154 A1* | 10/2018 | Ghazaleh | G06F 3/0659 |
| 2019/0173675 A1* | 6/2019 | Kaufman | H04L 9/0894 |
| 2023/0388105 A1* | 11/2023 | Kaino | H04L 9/0816 |

FOREIGN PATENT DOCUMENTS

| | | |
|---|---|---|
| JP | 2011-248711 | 12/2011 |
| JP | 2014-044264 | 3/2014 |
| JP | 2014-509753 | 4/2014 |
| JP | 2014-096692 | 5/2014 |
| KR | 10-2007-0107569 | 11/2007 |

OTHER PUBLICATIONS

Extended European Search Report (EESR) from European Patent Office (EPO) in European Patent Application No. 20759534.9, dated Mar. 23, 2022.

Adi Shamir: "How to Share a Secret", Communications of the ACM, Association for Computing Machinery, Inc., United States, vol. 22, No. 11, Nov. 1, 1979 (Nov. 1, 1979), pp. 612-613.

International Search Report (ISR) from International Searching Authority (Japan Patent Office) in International Pat. Appl. No. PCT/JP2020/001990, dated Apr. 14, 2020, along with an English language translation.

Kitamikado et al., "3. Proposed Method Utilizing MOBIKE", Proposal for IPsecGW Redundancy Architecture Utilizing MOBIKE. Proceedings of the 2009 IEICE Society Conference (2), B-6-27, Sep. 2009, p. 27, along with an English language translation.

Office Action issued by the China National Intellectual Property Administration (CNIPA) in Chinese Patent Application No. 202080016062.5, dated Oct. 27, 2023, together with an English language translation.

\* cited by examiner

Figure 14:
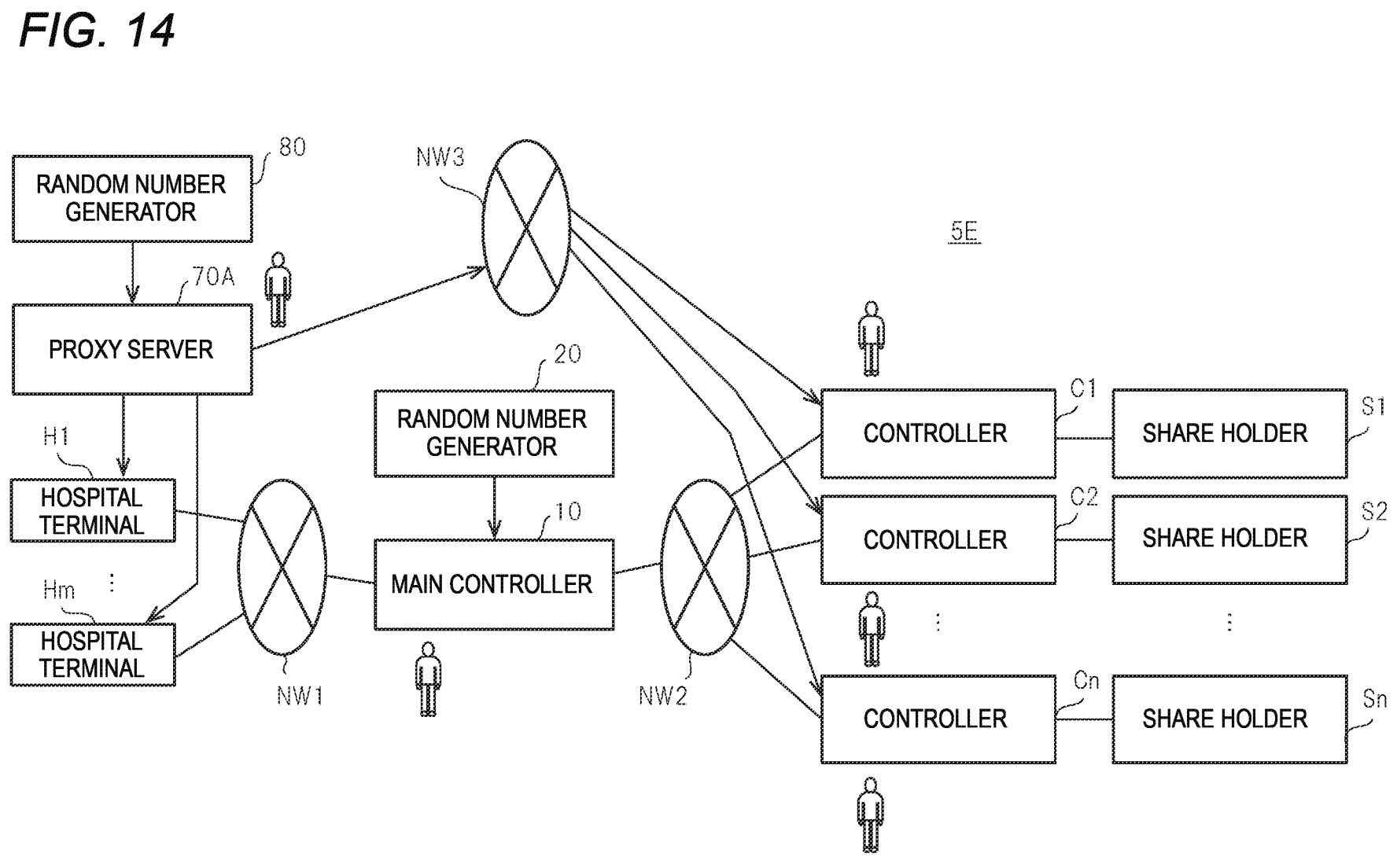

S1  SHARE HOLDER
S2  SHARE HOLDER
Sn  SHARE HOLDER

C1  CONTROLLER
C2  CONTROLLER
Cn  CONTROLLER

NW2

20  RANDOM NUMBER GENERATOR
10  MAIN CONTROLLER

NW3

NW1

80  RANDOM NUMBER GENERATOR

70A  PROXY SERVER

H1  HOSPITAL TERMINAL
Hm  HOSPITAL TERMINAL

FIG. 17

| ORIGINAL DATA OD1 | ORIGINAL DATA OD2 | ORIGINAL DATA OD3 | ORIGINAL DATA OD4 | ORIGINAL DATA OD5 | ORIGINAL DATA OD6 | ORIGINAL DATA OD7 | ORIGINAL DATA OD8 |
|---|---|---|---|---|---|---|---|

OD

| RANDOM NUMBER A1 | RANDOM NUMBER A2 | RANDOM NUMBER A3 | RANDOM NUMBER A4 | RANDOM NUMBER A5 | RANDOM NUMBER A6 | RANDOM NUMBER A7 | RANDOM NUMBER A8 |
|---|---|---|---|---|---|---|---|

A

| | | | |
|---|---|---|---|
| ORIGINAL DATA OD1 | ORIGINAL DATA OD2 | ORIGINAL DATA OD3 | ORIGINAL DATA OD4 |
| XOR | XOR | XOR | XOR |
| ORIGINAL DATA OD5 | ORIGINAL DATA OD6 | ORIGINAL DATA OD7 | ORIGINAL DATA OD8 |
| XOR | XOR | XOR | XOR |
| RANDOM NUMBER A1 | RANDOM NUMBER A2 | RANDOM NUMBER A3 | RANDOM NUMBER A4 |
| XOR | XOR | XOR | XOR |
| RANDOM NUMBER A5 | RANDOM NUMBER A6 | RANDOM NUMBER A7 | RANDOM NUMBER A8 |
| DISTRIBUTED DATA OD1D | DISTRIBUTED DATA OD2D | DISTRIBUTED DATA OD3D | DISTRIBUTED DATA OD4D |

ODD

| RANDOM NUMBER B1 | RANDOM NUMBER B2 | RANDOM NUMBER B3 | RANDOM NUMBER B4 | RANDOM NUMBER B5 | RANDOM NUMBER B6 | RANDOM NUMBER B7 | RANDOM NUMBER B8 |
|---|---|---|---|---|---|---|---|

E(OD)

| RANDOM NUMBER B1 | RANDOM NUMBER B2 | RANDOM NUMBER B3 | RANDOM NUMBER B4 | RANDOM NUMBER B5 | RANDOM NUMBER B6 | RANDOM NUMBER B7 | RANDOM NUMBER B8 |
|---|---|---|---|---|---|---|---|
| XOR | XOR | XOR | XOR | XOR | XOR | XOR | XOR |
| ORIGINAL DATA OD1 | ORIGINAL DATA OD2 | ORIGINAL DATA OD3 | ORIGINAL DATA OD4 | ORIGINAL DATA OD5 | ORIGINAL DATA OD6 | ORIGINAL DATA OD7 | ORIGINAL DATA OD8 |
| CIPHER 1 | CIPHER 2 | CIPHER 3 | CIPHER 4 | CIPHER 5 | CIPHER 6 | CIPHER 7 | CIPHER 8 |

*FIG. 19*

| CIPHER 1 | CIPHER 2 | CIPHER 3 | CIPHER 4 |
|---|---|---|---|
| XOR | XOR | XOR | XOR |
| CIPHER 5 | CIPHER 6 | CIPHER 7 | CIPHER 8 |
| XOR | XOR | XOR | XOR |
| RANDOM NUMBER A1 | RANDOM NUMBER A2 | RANDOM NUMBER A3 | RANDOM NUMBER A4 |
| XOR | XOR | XOR | XOR |
| RANDOM NUMBER A5 | RANDOM NUMBER A6 | RANDOM NUMBER A7 | RANDOM NUMBER A8 |
| CIPHER 1D | CIPHER 2D | CIPHER 3D | CIPHER 4D |

E(ODD)

SECURE SECRET SHARING STORAGE SYSTEM USING CLOUD SERVICE

TECHNICAL FIELD

The present disclosure relates to a secure secret sharing storage system using a cloud service which stores a plurality of pieces of distributed data generated by distributed processing of original data.

BACKGROUND ART

In the related art, a method using polynomial interpolation as a threshold secret sharing method is well known, but this method requires time for calculation processing. Therefore, a threshold secret sharing method using exclusive OR (so-called XOR processing) is well known as a method for satisfying real-time performance. For example, Patent Document 1 suggests a configuration of a secret sharing device that reduces the data amount of distributed data by using a threshold secret sharing method that uses secure XOR processing in which original data is not guessed from distributed data and that can be easily used since the number of variances and a threshold can be freely set.

As a threshold secret sharing method in the related art including Patent Literature 1, for example, there is known a method of using a physical random number originally generated based on a signal such as thermal noise (that is, a random number that is difficult to guess) as a random number to be used for the secret sharing processing so that it is difficult to recover the original data from the distributed data.

CITATION LIST

Patent Literature

Patent Literature 1: JP-A-2014-509753

SUMMARY OF INVENTION

Technical Problem

However, when such a physical random number is used, since a physical random number generator is expensive, it is not easy to install a physical random number generator to each user who performs secret sharing and thus it is difficult to disseminate the secret sharing technology in substance and socially.

The present disclosure is suggested in view of the above circumstances in the related art, and an object thereof is to provide a secret sharing storage system and a secret sharing storage method that suppress cost increase due to the installation of a physical random number generator that generates a physical random number used for secret sharing regardless of the number of users who require secret sharing and that support the realization of secure storage of original data to be concealed.

Solution to Problem

According to the present disclosure, there is provided a secret sharing storage system including at least one user terminal; n units (n: an integer of 2 or more) of storage devices; and a main controller that is communicably connected to a random number generator, in which the main controller acquires a random number generated by the random number generator in a case of receiving original data sent from the user terminal, generates n pieces of distributed data by executing distributed processing on the original data by using the random number, and stores the n pieces of distributed data respectively in the corresponding n units of storage devices.

According to the present disclosure, there is provided a secret sharing storage system including n units (n: an integer of 2 or more) of controllers that are provided to correspond respectively to n units of storage devices; a main controller that is communicably connected to the n units of controllers, at least one user terminal, and a random number generator; and a communication management server that is communicably connected to the n units of controllers, the user terminal, and a second random number generator, in which, in a case that the communication management server receives bibliographic information of original data, the communication management server executes distributed processing on a second random number generated by the second random number generator to generate n pieces of distributed random number data, sends the n pieces of distributed random number data respectively to the corresponding n units of controllers, and also sends the second random number respectively to the user terminal, and in a case that the main controller receives encrypted original data obtained by encrypting the original data by using the second random number from the user terminal, the main controller acquires a random number generated by the random number generator, performs distributed processing on the encrypted original data by using the random number to generate n pieces of encrypted distributed data, and sends the n pieces of encrypted distributed data respectively to the corresponding n units of controllers.

According to the present disclosure, there is provided a secret sharing storage method using a secret sharing storage system including a main controller that is communicably connected to at least one user terminal, n unit (n: an integer of 2 or more) of storage devices, and a random number generator. The method includes acquiring a random number generated by the random number generator, in a case that original data sent from the user terminal is received; executing distributed processing on the original data by using the random number to generate n pieces of distributed data; and storing the n pieces of distributed data respectively in the corresponding n units of storage devices.

According to the present disclosure, there is provided a secret sharing storage method using a secret sharing storage system including n units (n: an integer of 2 or more) of controllers that are provided to correspond to n units of storage devices, a main controller that is communicably connected to the n units of controllers, at least one user terminal, and a random number generator, and a communication management server that is communicably connected to the n units of controllers, the user terminal, and a second random number generator. The method includes executing distributed processing on a second random number generated by the second random number generator in a case that bibliographic information of original data is received from the user terminal to generate n pieces of distributed random number data; sending the n pieces of distributed random number data to the corresponding n units of controllers and also sending the second random number to the user terminal; acquiring a random number generated by the random number generator in a case that encrypted original data encrypted by the original data using the second random number is received from the user terminal; executing distributed processing on the encrypted original data by using the random number to generate n pieces of encrypted distributed data; and sending the n pieces of encrypted distributed data to the corresponding n units of controllers.

Advantageous Effects of Invention

According to the present disclosure, it is possible to suppress cost increase due to the installation of a physical random number generator that generates a physical random number used for secret sharing regardless of the number of users who require secret sharing and support the realization of secure storage of original data to be kept secret.

BRIEF DESCRIPTION OF DRAWINGS

FIG. 14 is a diagram of a system configuration example of a secret sharing system according to Embodiment 3.

FIG. 17 is a table illustrating examples of original data, a physical random number, and distributed data.

FIG. 18 is a table illustrating examples of a physical random number and encrypted original data.

FIG. 19 is a table illustrating an example of distributed encrypted distributed data generated by performing distributed processing on encrypted original data.

DESCRIPTION OF EMBODIMENTS

Hereinafter, embodiments in which the configuration and operation of a secret sharing storage system and a secret sharing storage method according to the present disclosure are specifically disclosed are described in detail with reference to the drawings as appropriate. However, detailed explanations more than necessary may be omitted. For example, detailed explanations of already well-known matters and duplicate explanations for substantially the same configurations may be omitted. This is to avoid unnecessary redundancy of the following description and to facilitate the understanding of those skilled in the art. The accompanying drawings and the following description are provided for those skilled in the art to fully understand the present disclosure and are not intended to limit the subject matter described in the claims.

The secret sharing system according to the present disclosure stores (preserves) a plurality of pieces of generated distributed data by performing secret sharing processing (hereinafter, referred to as "distributed processing") on original data that is concealed data in a plurality of storage devices. The secret sharing system restores the original data that is the concealed data by performing restoration processing by using the plurality of pieces of distributed data.

In the following embodiment, as an example of the original data that is the concealed data, electronic medical record data including personal information such as the patient's name, age, gender, address, occupation, and medical history managed in the hospital (hereinafter, referred to as "hospital data") is exemplified and described. However, in the following embodiment, as long as the original data is concealed data, the original data is not limited to the above hospital data.

Embodiment 1

Figure 1:
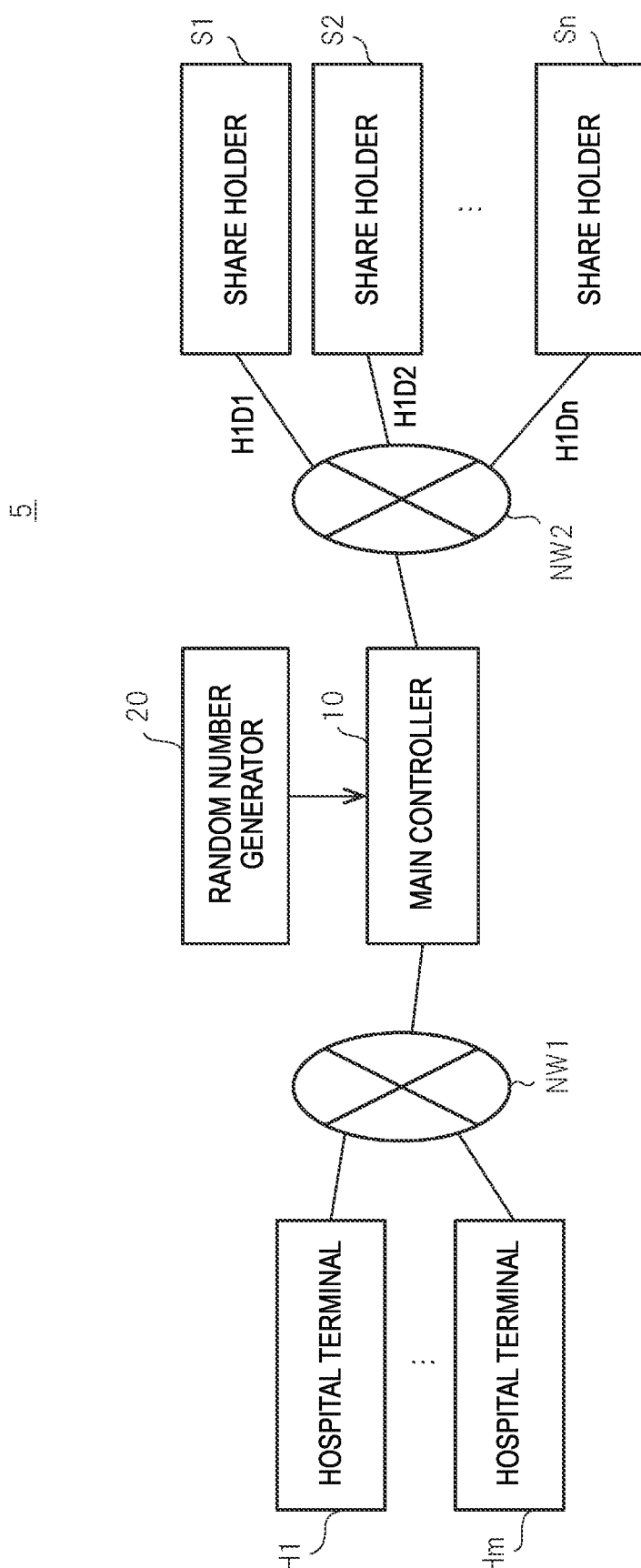
FIG. 1 is a diagram illustrating a system configuration example of a secret sharing system according to Embodiment 1.

FIG. 1 is a diagram illustrating a system configuration example of a secret sharing storage system 5 according to Embodiment 1. The secret sharing storage system 5 is configured to include a main controller 10, a random number generator 20, a plurality of hospital terminals H1 to Hm, a plurality of share holders S1 to Sn. Both m and n are integers of 2 or greater and may be the same value or may be different values.

The plurality of hospital terminals H1 to Hm are communicably connected to the main controller 10 via a network NW1. The network NW1 may be, for example, a wide area network such as the Internet. The network NW1 may be a private network such as a Virtual Private Network (VPN) that virtually connects the hospital terminals H1 to Hm to the main controller 10 or may be a dedicated line.

As an example of the storage device, the plurality of share holders S1 to Sn are communicably connected to the main controller 10 via a network NW2. The network NW2 may be, for example, a wide area network such as the Internet, in the same manner as the network NW1. The network NW2 may be a private network such as a VPN that virtually connects the share holders S1 to Sn to the main controller 10 or may be a dedicated line.

For the sake of simplicity, the hospital terminals H1 to Hm as an example of the user terminal have the same internal configuration, and the hospital terminal H1 is exemplified and described as required. The hospital terminals H1 to Hm are user terminals used by managers who manage hospital data such as electronic medical record data. Here, as the user terminal, a hospital terminal is exemplified, but the user terminal may be a business terminal used in a company or an organization that handles concealed data. Therefore, examples of the original data that is concealed data include personal pension record data, product design data, experimental data, undisclosed image data, and unpublished music data, in addition to the hospital data.

The random number generator 20 is a physical random number generator that generates a physically fluctuating value (in other words, a value that is difficult for a malicious third party to easily guess) as random number data. Examples of the random number data include data such as thermal noise or quantum fluctuations. In addition, in the secret sharing storage system 5, the random number generator 20 is preferably a physical random number generator but may be a pseudo-random number generator. When a lamp-type secret sharing method is used as this method, a part of the original data may be used as a part of random numbers in this method.

If hospital data transmitted from at least one of the hospital terminals H1 to Hm (for example, the hospital terminal H1) is received, the main controller 10 generates a plurality of (for example, n) pieces of distributed data by distributed processing using the physical random number generated by the random number generator 20. The main controller 10 includes a recording device 13 that stores a physical random number generated by the random number generator 20 (see FIG. 2) and performs distributed processing on the hospital data by using this physical random number. The main controller 10 generates distributed information indicating how distributed processing is performed on the original data (hospital data) at the time of executing the distributed processing by the same number (for example, n) of pieces as the number of pieces (for example, n) of the generated distributed data. In addition to the above information relating to the method of generating the distributed data, the distributed information may include a file name of the original data, a file name of the distributed data, an execution date of the distributed processing, the size of the distributed data, a part of the physical random number used for the generation of the distributed data (that is, the distributed processing), information of storage destination, and authentication information for accessing the storage destination, as the biographical information of the distributed data.

For example, when three pieces of distributed data are generated, the main controller 10 stores a set of first distributed data and corresponding first distributed information in a first share holder, stores a set of second distributed data and corresponding second distributed information in a second share holder, and, in the same manner, stores a set of third distributed data and corresponding third distributed information in a third share holder.

The main controller 10 restores the original data (that is, hospital data) by the restoration processing using the plurality of pieces of distributed data generated in advance with respect to the hospital data (an example of the original data) and the distributed information corresponding to respective pieces of distributed data. When the physical random number used at the time of the distributed processing is stored in the recording device 13, the main controller 10 may restore the original hospital data from the plurality of pieces of distributed data by using the physical random number.

Figure 2:
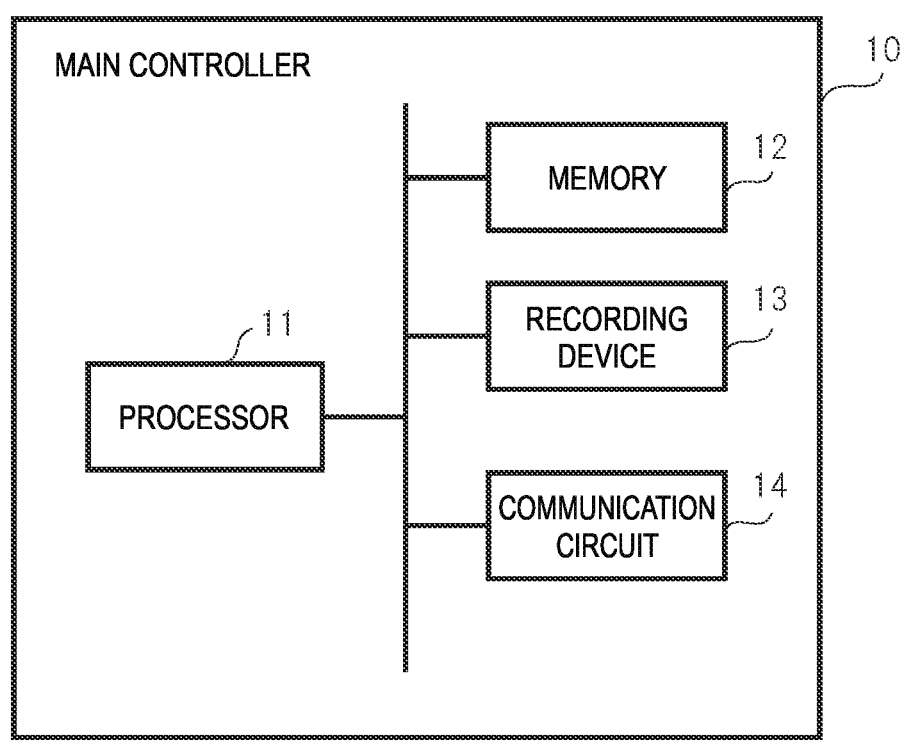
FIG. 2 is a block diagram illustrating a hardware configuration example of a main controller.

FIG. 2 is a block diagram illustrating a hardware configuration example of the main controller 10. The main controller 10 has a configuration at least including a processor 11, a memory 12, the recording device 13, and a communication circuit 14.

The processor 11 is configured, for example, by using a Central Processing Unit (CPU), a Digital Signal Processor (DSP), or a Field Programmable Gate Array (FPGA) and operates according to a program or data stored in advance in the memory 12 in cooperation with the memory 12.

The processor 11 performs distributed processing of the hospital data sent from at least one (for example, the hospital terminal H1) of the hospital terminals H1 to Hm via the communication circuit 14 by using the physical random number received from the random number generator 20 via the communication circuit 14. The processor 11 transmits the set of the same number of pieces of distributed data generated by the distributed processing and the distributed information corresponding to the distributed data to the share holders S1 to Sn respectively corresponding thereto via the communication circuit 14.

If the sets of the distributed data and corresponding distributed information are acquired respectively from the plurality of share holders S1 to Sn, the processor 11 performs the restoration processing of the hospital data that is the original data by using a predetermined value (threshold) required for the restoration processing or all sets of the distributed data and the distributed information.

The memory 12 is configured, for example, by using a Random Access Memory (RAM) and a Read Only Memory (ROM) and temporarily holds programs and data required for executing the operation of the main controller 10 and further data or information generated during the operation. The RAM is, for example, a work memory used during the operation of the main controller 10. The ROM, for example, stores and holds the program and the data for controlling the main controller 10, in advance.

The recording device 13 is configured, for example, by using the Hard Disk Drive (HDD) or the Solid State Drive (SSD) and stores the physical random number generated by the random number generator 20.

The communication circuit 14 is configured by using a circuit that communicates with various devices communicably connected to the main controller 10. The communication circuit 14 performs data communication with the plurality of hospital terminals H1 to Hm via the network NW1. The communication circuit 14 performs data communication with the plurality of share holders S1 to Sn via the network NW2. The main controller 10 and the random number generator 20 may be connected to each other by wire or wirelessly.

The share holders S1 to Sn are recording devices that store any pieces of the distributed data among the plurality of pieces of distributed data generated by the main controller 10. The share holders S1 to Sn may be an online cloud server as viewed from the main controller 10 or may be a storage built in the main controller.

Figure 3:
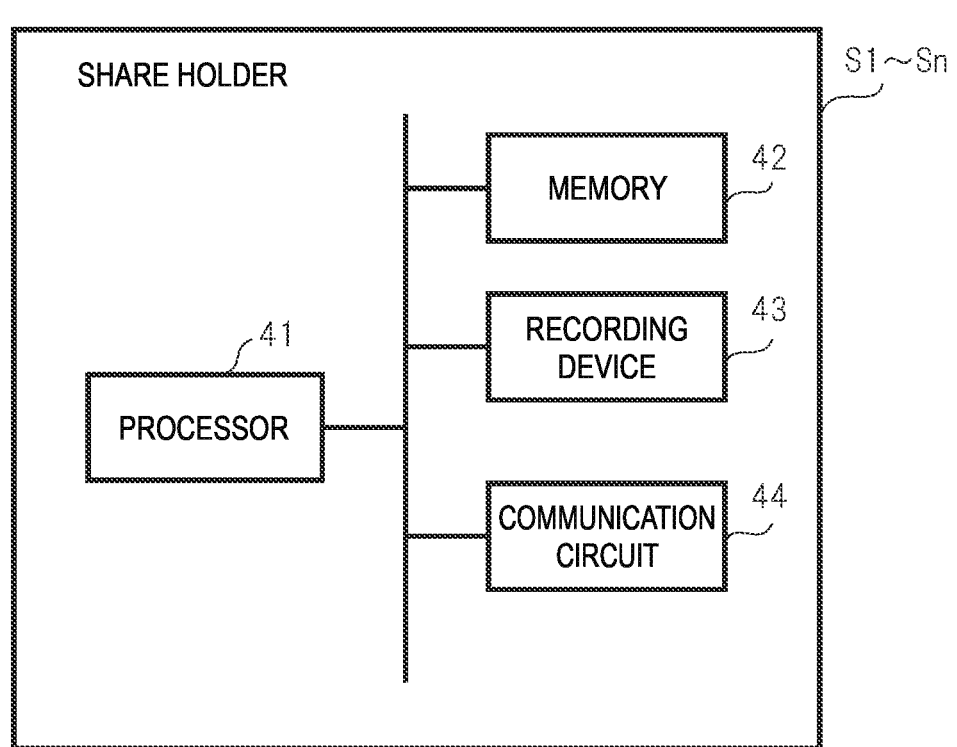
FIG. 3 is a block diagram illustrating a hardware configuration example of a share holder.

FIG. 3 is a block diagram illustrating a hardware configuration example of the share holders S1 to Sn. The share holders S1 to Sn have the same internal configuration and specifically have the configuration at least including a processor 41, a memory 42, a recording device 43, and a communication circuit 44.

The processor 41 is configured, for example, by using CPU, DSP, or FPGA, and operates according to the program and data stored in the memory 42 in advance in cooperation with the memory 42. If any set of the distributed data and the distributed information transmitted from the main controller 10 via the communication circuit 44 is received, the processor 41 stores (preserves) the set of the distributed data and the distributed information in the recording device 43. If an acquisition demand of the distributed data transmitted from the main controller 10 via the communication circuit 44 is received, the processor 41 reads and acquires the set of the distributed data and the distributed information stored in the recording device 43 and transmits the set to the main controller 10 via the communication circuit 44.

The memory 42 is configured, for example, with a RAM and a ROM and temporarily holds the program and the data required during the execution of the operations of the share holders S1 to Sn and further the data or the information generated during the operation. The RAM is, for example, a work memory used during the operations of the share holders S1 to Sn. The ROM, for example, stores and holds the program and the data for controlling the share holders S1 to Sn, in advance.

The recording device 43 is configured, for example, by using HDD or SSD, and stores (preserves) any set of the distributed data and the distributed information generated by the distributed processing of the main controller 10.

The communication circuit 44 is configured by using a circuit that communicates with the main controller 10. The communication circuit 44 performs data communication with the main controller 10 via the network NW2.

Subsequently, the distributed processing and the restoration processing of the secret sharing storage system 5 according to Embodiment 1 are described.

As described above, in the secret sharing system in the related art, the distributed processing and the restoration processing are executed in the hospital terminals in each hospital. Therefore, expensive random number generators such as the random number generators 20 in each hospital terminal are required, and thus the cost increase due to the construction of the secret sharing system in the hospital is unavoidable. Meanwhile, in the secret sharing storage system 5 according to Embodiment 1, one random number generator 20 is provided corresponding to the main controller 10. The main controller 10 performs distributed processing on the original data (that is, the hospital data) transmitted from the hospital terminal (for example, the hospital terminal H1).

Figure 4:
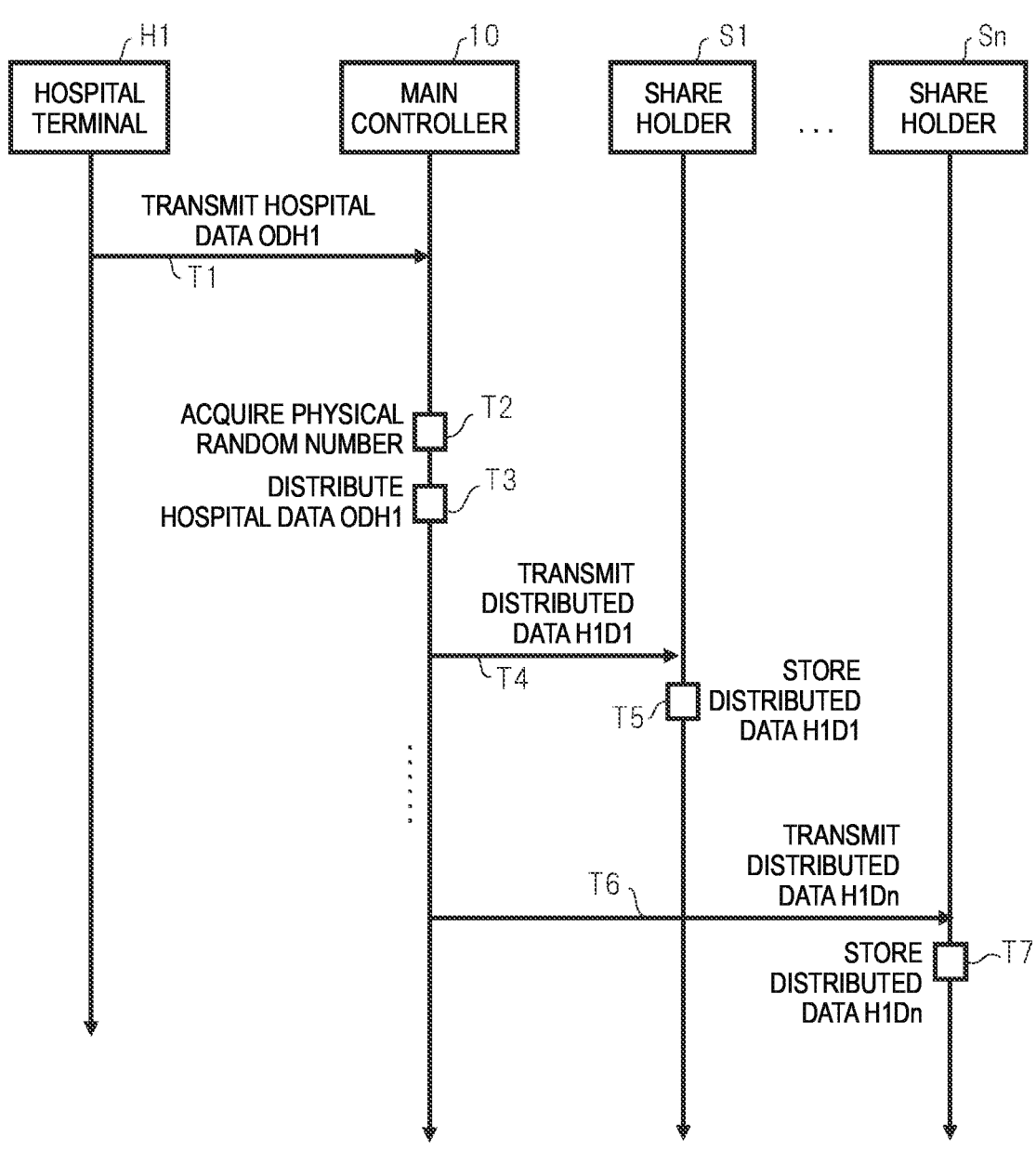
FIG. 4 is a sequence diagram illustrating an operation procedure example of distributed processing.

FIG. 4 is a sequence diagram illustrating an operation procedure example of the distributed processing. In the description of FIG. 4, the hospital terminal H1 is exemplified as an example of the hospital terminal.

In FIG. 4, when the hospital terminal H1 requests (demands) distributed processing of hospital data ODH1 (an example of the original data) from the main controller 10, the secret sharing storage system 5 transmits the hospital data ODH1 of the plain text data to the main controller 10 (T1). The main controller 10 receives the hospital data ODH1 of the plain text data from the hospital terminal H1 via the network NW1.

For example, when the hospital data ODH1 is received, the main controller 10 acquires the physical random number generated by the random number generator 20 and stores the physical random number in the recording device 13 (T2). The main controller 10 may not store the acquired physical random number in the recording device 13, but may temporarily store the acquired physical random number in the memory 12 and delete the physical random number after executing the distributed processing of Step T3. However, in order not to leave the information required for the restoration in the main controller 10, the acquired physical random number is preferably deleted. The main controller 10 executes the distributed processing of the hospital data ODH1 by using this physical random number and generates sets of a plurality (n) of pieces of distributed data H1D1 to H1Dn and distributed information corresponding to the respective pieces of distributed data so that the number thereof is identical to the number of the arranged share holders S1 to Sn (T3). After the distributed processing of Step T3 is executed, the main controller 10 preferably deletes the hospital data ODH1 that is the original data.

The main controller 10 transmits the sets of the generated distributed data H1D1 and the distributed information corresponding to the distributed data H1D1 via the network NW2 to the share holder S1 (T4). The share holder S1 stores the set of the distributed data H1D1 and the distributed information corresponding to the distributed data H1D1 which is received from the main controller 10 to the recording device 43 (T5).

In the same manner, the main controller 10 executes the same processing as in Step T5 on the other share holders and transmits the set of the generated distributed data H1Dn and the distributed information corresponding to the distributed data H1Dn to the share holder Sn via the network NW2 (T6). The share holder Sn stores the set of the distributed data H1Dn and the distributed information corresponding to the distributed data H1Dn which is received from the main controller 10, to the recording device 43 (T7). The distributed data stored in the share holders S1 to Sn is plain text data (in other words, unencrypted data).

When the main controller 10 receives the data, the received hospital data may be encrypted in advance in the hospital terminal H1, and the distributed data becomes encrypted distributed data. Here, a case where distributed processing is executed on the hospital data ODH1 from the hospital terminal H1 is described, but the same distributed processing can be executed on the hospital data from the other hospital terminals.

Figure 5:
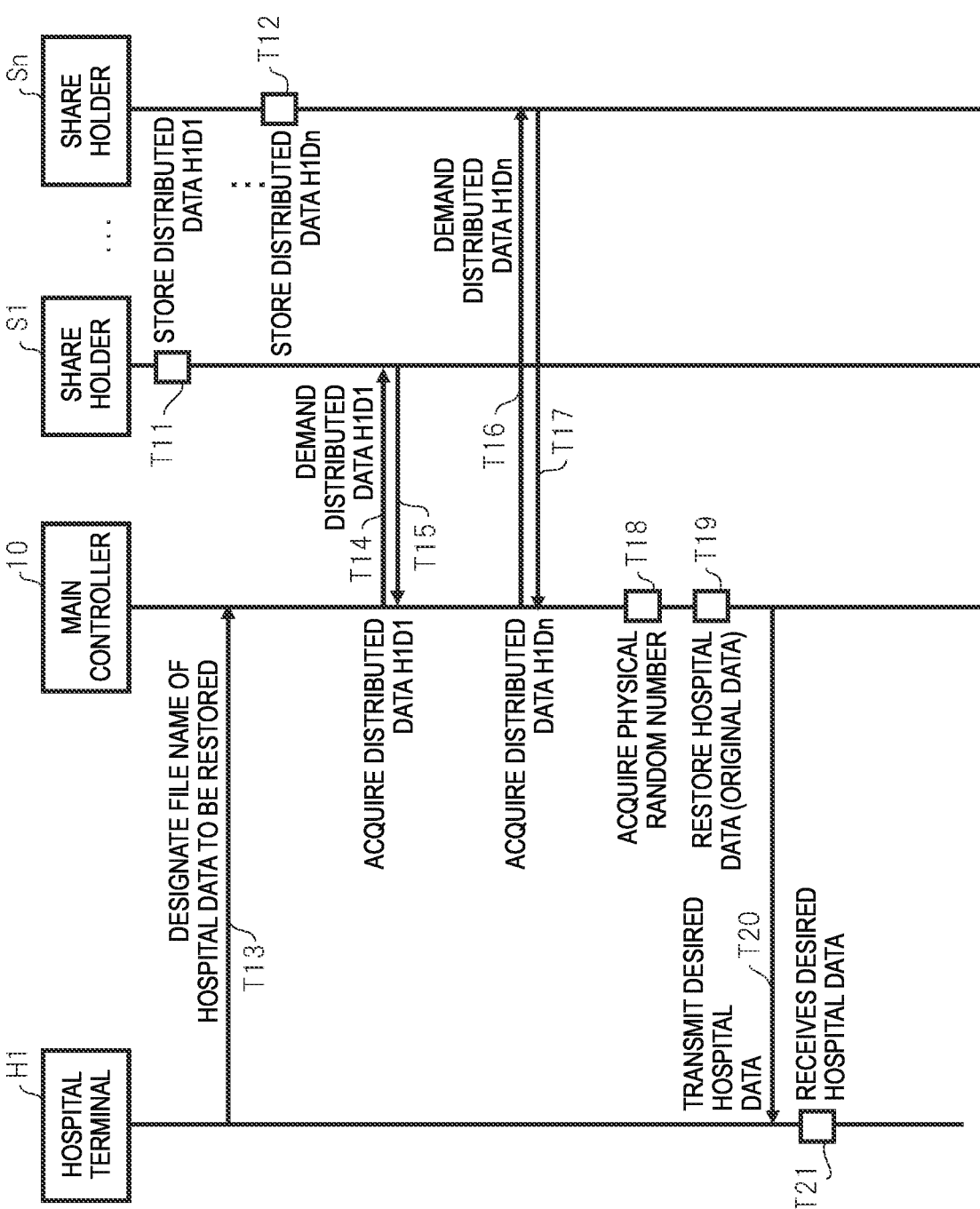
FIG. 5 is a sequence diagram illustrating an operation procedure example of restoration processing.

FIG. 5 is a sequence diagram illustrating an operation procedure example of the restoration processing. In the description of FIG. 5, the hospital terminal H1 is provided as an example of the hospital terminal.

In FIG. 5, in the secret sharing storage system 5, the share holders S1 to Sn store the distributed data H1D1 to H1Dn respectively corresponding thereto in the recording device 43 (T11 and T12). When the restoration processing of the hospital data ODH1 (an example of original data) is requested (demanded) from the main controller 10, the hospital terminal H1 designates a file name of the hospital data to be subjected to the restoration processing (T13).

The main controller 10 transmits the acquisition demand of the generated distributed data corresponding to the file name to the share holder S1 based on the file name designated by the hospital terminal H1 (T14). The share holder S1 reads the set of the distributed data H1D1 and the corresponding distributed information stored in the recording device 43 according to the acquisition demand and replies to the main controller 10 (T15).

In the same manner, the main controller 10 transmits the acquisition demand of the distributed data generated to correspond to the file name to the share holder Sn based on the file name designated by the hospital terminal H1 (T16). The share holder Sn reads the distributed data H1Dn and the corresponding distributed information stored in the recording device 43 according to the acquisition demand and replies to the main controller 10 (T17).

In this manner, through Steps T11 to T17, the main controller 10 receives the sets of the distributed data and the corresponding distributed information transmitted respectively from all of the share holders S1 to Sn via the network NW2. When the physical random number used during the distributed processing (see Step T3) is stored in the recording device 13, the main controller 10 may read and acquire this physical random number (T18). The physical random number acquired in Step T18 is not necessary for restoring the distributed data H1D1 to H1Dn, and thus Step T18 may be omitted. Subsequently, the main controller 10 executes the restoration processing using the plurality of pieces of distributed data H1D1 to H1Dn and restores the hospital data ODH1 that is the original data (T19). When the physical random number is acquired in Step T18, this acquired physical random number may be used in the restoration processing in Step T19. Subsequently, the main controller 10 transmits the restored hospital data ODH1 (that is, the desired hospital data) to the hospital terminal H1 (T20). The main controller 10 may omit the processing of Step T18. That is, the main controller 10 is not required to continuously hold the physical random number stored in Step T2. In this case, the main controller 10 can restore the hospital data ODH1 that is the original data by using the distributed information corresponding to the distributed data transmitted respectively from the share holders S1 to Sn.

The hospital terminal H1 receives the hospital data ODH1 transmitted from the main controller 10 (T21). Accordingly, the hospital terminal H1 can securely obtain the hospital data ODH1.

In this manner, in the secret sharing storage system 5 of Embodiment 1, the main controller 10 performs the distributed processing and the restoration processing of the hospital data that is the original data transmitted from the hospital terminal. Therefore, one random number generator 20 is closely installed to correspond to the single main controller 10. For security reasons, the random number generator 20 is preferably installed as close as possible to the main controller 10. Therefore, the random number generator 20 may be provided inside the main controller 10. That is, the main controller 10 itself may have the function of the random number generator 20. In addition, the random number generator 20 is installed remotely from the main controller 10 and may be connected to connected via a network (not illustrated), but the main controller 10 and the random number generator 20 are preferably connected to each other via a secure network.

The hospital terminals H1 to Hm do not include the configuration of the main controller 10 and can request the distributed processing of the original data from the main controller 10 arranged outside the hospital. Therefore, compared with a case of including the configurations of the main controller 10 and the random number generator 20 in each of the hospital terminals H1 to Hm, one main controller 10 and one random number generator 20 are merely arranged. Therefore, the secret sharing storage system 5 can be constructed at a low cost.

From the above, the secret sharing storage system 5 includes at least one of the hospital terminals H1 to Hm, the n share holders S1 to Sn, and the main controller 10 communicably connected to the random number generator 20. If the hospital data ODH1 sent from the hospital terminal H1 is received, the main controller 10 acquires the physical random number generated by the random number generator 20, executes the distributed processing on the hospital data ODH1 by using the physical random number, and generates n pieces of the distributed data H1D1 to H1Dn. The main controller 10 stores n pieces of the distributed data in the n share holders S1 to Sn respectively corresponding thereto.

Accordingly, the secret sharing storage system 5 can suppress the cost increase according to the installation of the random number generator 20 that generates the physical random number used during the secret sharing regardless of the number of hospital terminals (that is, the number of users) requiring the secret sharing of the original data. Accordingly, the secret sharing storage system 5 can support the realization of the secure storage of the original data to be concealed while the cost increase accompanied by the system construction is suppressed as much as possible.

The main controller 10 acquires n distributed data H1D1 to H1Dn stored in the n share holders S1 to Sn, respectively, according to restore indication of the original data from the hospital terminal H1. The main controller 10 restores the hospital data ODH1 that is the original data from n distributed data H1D1 to H1Dn and sends the hospital data to the hospital terminal H1. Accordingly, the secret sharing storage system 5 can narrow down the execution subjects that enable the restoration processing so that the restoration processing of the hospital data that is the original data cannot be executed other than the main controller 10. That is, the restoration of the original data by a third party other than the person who uses the main controller 10 can be effectively suppressed. If the above original data can be restored, the restoration leads to the leakage of hospital data with extremely high personal information features. However, according to Embodiment 1, the data leakage of hospital data can be firmly prevented, and thus the demarcation point of responsibility is clarified.

Modification 1 of Embodiment 1

According to Embodiment 1, the main controller 10 can maliciously acquire, for example, plain text data of the hospital data (that is, original data) managed by the hospital terminal. According to Modification 1 of Embodiment 1, a preservation destination of the distributed data is not known to the manager of the main controller 10.

Figure 6:
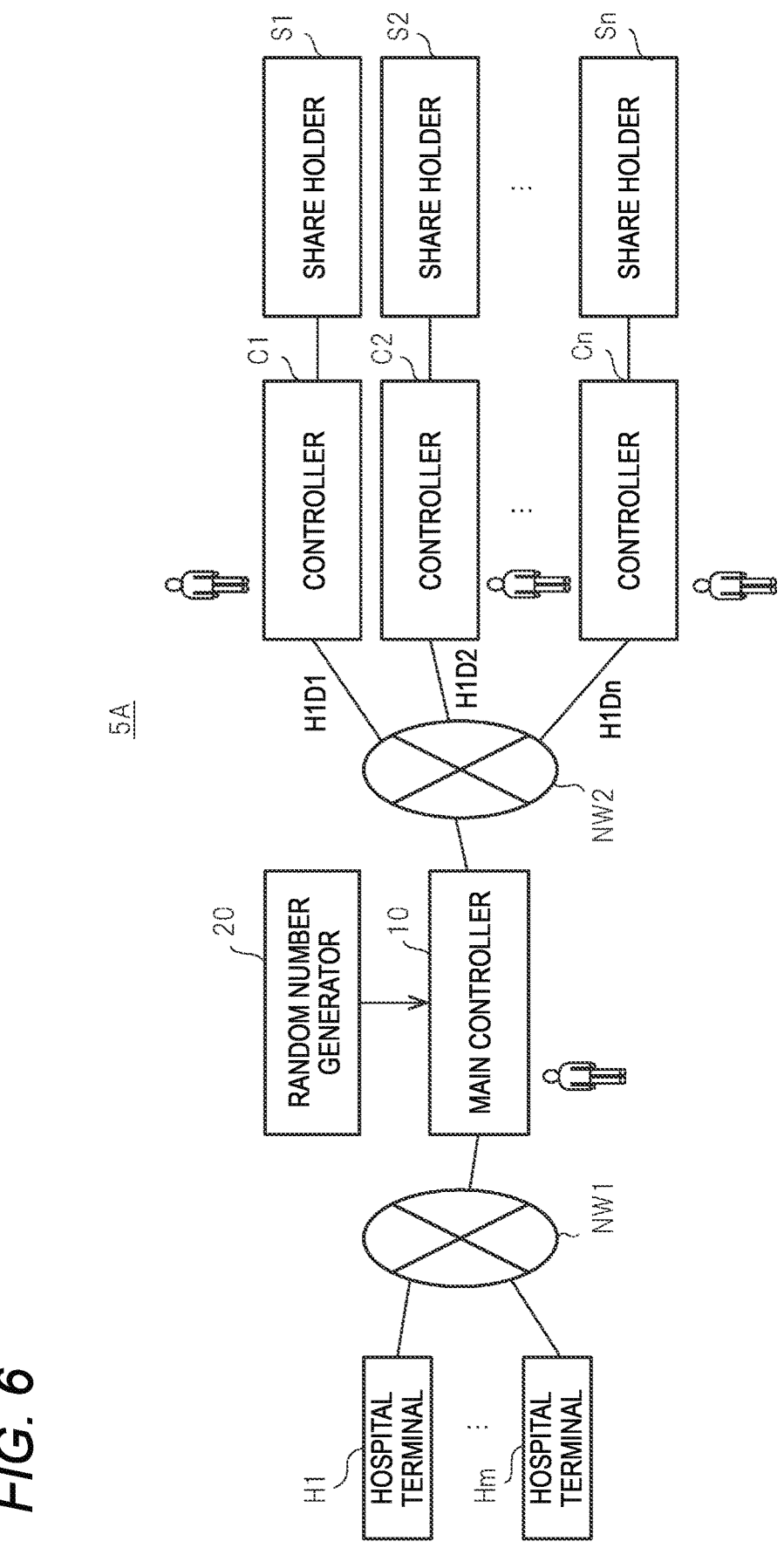
FIG. 6 is a diagram illustrating a system configuration example of the secret sharing system according to Modification 1 of Embodiment 1.

FIG. 6 is a diagram illustrating the configuration example of a secret sharing storage system 5A according to Modification 1 of Embodiment 1. In the secret sharing storage system 5A, the same components as in the secret sharing storage system 5 according to Embodiment 1 are denoted by the same reference numerals, and the descriptions thereof are simplified or omitted.

In the secret sharing storage system 5A, controllers C1 to Cn in the same number of the installed share holders S1 to Sn are interposed respectively between the main controller 10 and the plurality of share holders S1 to Sn in a one-to-one correspondence.

In the same manner as in Embodiment 1, the main controller 10 receives the hospital data (for example, the hospital data ODH1) from at least one of the hospital terminals H1 to Hm via the network NW1, executes the distributed processing of the hospital data by using the physical random number generated by the random number generator 20, and generates the n distributed data H1D1 to H1Dn in total and logical distributed information. The logical distributed information is generated by the distributed processing of the hospital data in the main controller 10. Specifically, the logical distributed information includes file names of the original data, file names of n pieces of the distributed data, the execution date of the distributed processing, the size of the distributed data, the physical random number used for the generation (that is, distributed processing) of the distributed data, the information relating to the n controllers that are distribution destinations, and the like, in addition to the information relating to a method of generating n pieces of distributed data. Accordingly, the main controller 10 cannot distinguish the information of the share holders S1 to Sn in which the distributed data is finally stored (preserved) based on the logical distributed information.

The main controller 10 performs distribution processing of distributing n distributed data H1D1 to H1Dn in total and the logical distributed information to the plurality of controllers C1 to Cn one by one, via the network NW2. After the distributed processing is executed, the main controller 10 preferably deletes the hospital data that is the original data.

Figure 7:
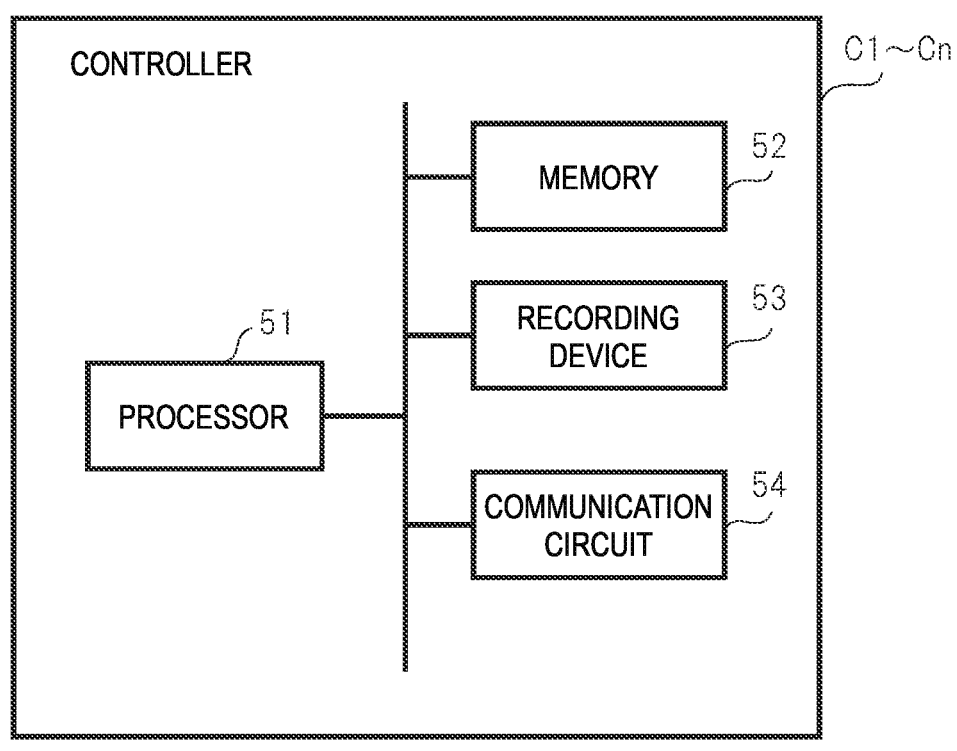
FIG. 7 is a block diagram illustrating a hardware configuration example of a controller.

FIG. 7 is a block diagram illustrating a hardware configuration example of the controllers C1 to Cn. Each of the controllers C1 to Cn includes the same internal configuration and specifically has a configuration at least including a processor 51, a memory 52, a recording device 53, and a communication circuit 54.

The processor 51 is configured, for example, by using CPU, DSP, or FPGA, and operates according to the program and data stored in the memory 52 in advance in cooperation with the memory 52. The processor 51 receives the distributed data and the logical distributed information transmitted from the main controller 10 via the communication circuit 54. The processor 51 uses the logical distributed information and the information of the storage destination (for example, the share holder S1) corresponding to the own controller which is held in advance to generate substantial distributed information relating to the distributed data received by the own controller (for example, the controller C1). The substantial distributed information is distributed information relating to the generation of the corresponding distributed data (see Embodiment 1). In addition to the information relating to the method of generating the distributed data, examples thereof include file names of the original data, file names of the distributed data, the execution date of the distributed processing, the size of the distributed data, a part of the physical random number used for the generation (that is, distributed processing) of the distributed data, the information of the storage destination, and the authentication information for accessing the storage destination, as the biographical information of the distributed data. According to the substantial distributed information corresponding to the distributed data, the processor 51 stores the share holder (for example, the share holder S1) corresponding to the corresponding distributed data.

The memory 52 is configured, for example, with a RAM and a ROM and temporarily holds the program and the data required during the execution of the operations of the controllers C1 to Cn and further the data or the information generated during the operation. The RAM is, for example, a work memory used during the operations of the controllers C1 to Cn. The ROM, for example, stores and holds the program and the data for controlling the controllers C1 to Cn, in advance.

The recording device 53 is configured, for example, by using HDD or SSD, and stores (preserves) any set of the distributed data and the substantial distributed information generated by the distributed processing of the main controller 10.

The communication circuit 54 is configured by using a circuit that communicates with the share holder (for example, the share holder S1) corresponding to the main controller 10 or the own controller. The communication circuit 54 performs data communication with the main controller 10 via the network NW2. The communication circuit 54 performs data communication with the share holder (for example, the share holder S1) corresponding to the own controller.

Each of the plurality of controllers C1 to Cn stores one set of the distributed data and the substantial logical information in any one corresponding share holder among the share holders S1 to Sn. That is, a manager of each of the plurality of controllers C1 to Cn grasps corresponding substantial distributed information including the storage destination of the distributed data and authentication information for accessing the storage destination, but cannot grasp substantial distributed information corresponding to the other distributed data. Each of the controllers C1 to Cn is connected to a corresponding share holder among the share holders S1 to Sn, and holds the authentication information in the corresponding share holder. Accordingly, differently from Embodiment 1, after the distributed processing of the original data, the main controller 10 can only indirectly receive the distributed data via each of the controllers C1 to Cn and cannot directly acquire all the distributed data from the plurality of share holders S1 to Sn.

In this manner, in the secret sharing storage system 5A according to Modification 1 of Embodiment 1, a manager who can grasp the distributed information including the preservation destinations of all the distributed data cannot exist. Accordingly, compared with Embodiment 1, the security related to the storage of distributed data can be further improved. Since the plurality of controllers C1 to Cn are provided respectively between the main controller 10 and the plurality of share holders S1 to Sn, for example, if any distributed data is leaked, which manager of the controller is responsible for the leakage can be easily and clearly distinguished. Device authentication may be performed respectively between the main controller 10 and the controllers C1 to Cn to prevent spoofing by a third party. For the device authentication, for example, an encryption and decryption technique using a two-way public key cryptosystem is used.

From the above, the secret sharing storage system 5A according to Modification 1 of Embodiment 1 further includes the n controllers C1 to Cn that are provided respectively to correspond the n share holders S1 to Sn and communicably connected to the main controller 10. The main controller 10 generates the logical distributed information relating to the generation of the plurality of pieces of distributed data H1D1 to H1Dn, respectively. The main controller 10 associates n pieces of distributed data with the logical distributed information and transmits the n pieces of distributed data respectively to the n corresponding controllers C1 to Cn. The n controllers C1 to Cn receive the distributed data and the logical distributed information corresponding to the own device (the own controller) from the main controller 10 and generate the substantial distributed information relating to the distributed data received by the own device by using the logical distributed information. Each of the n controllers C1 to Cn stores the substantial distributed information and the distributed data received by the own device (the own controller) in association with the n corresponding share holders S1 to Sn, respectively.

Accordingly, the secret sharing storage system 5A can securely store distributed data so that the manager of the main controller 10 does not know the final preservation destination of the distributed data. Accordingly, with the secret sharing storage system 5A, the manager who uses the main controller 10 can effectively prevent the leakage of the highly concealed hospital data as a probable malicious attack.

(Modification 2 of Embodiment 1)

According to Modification 1 of Embodiment 1, the controller and the share holder are connected to each other in a one-to-one correspondence. In Modification 2 of Embodiment 1, an example in which two or more share holders are connected to one controller.

Figure 8:
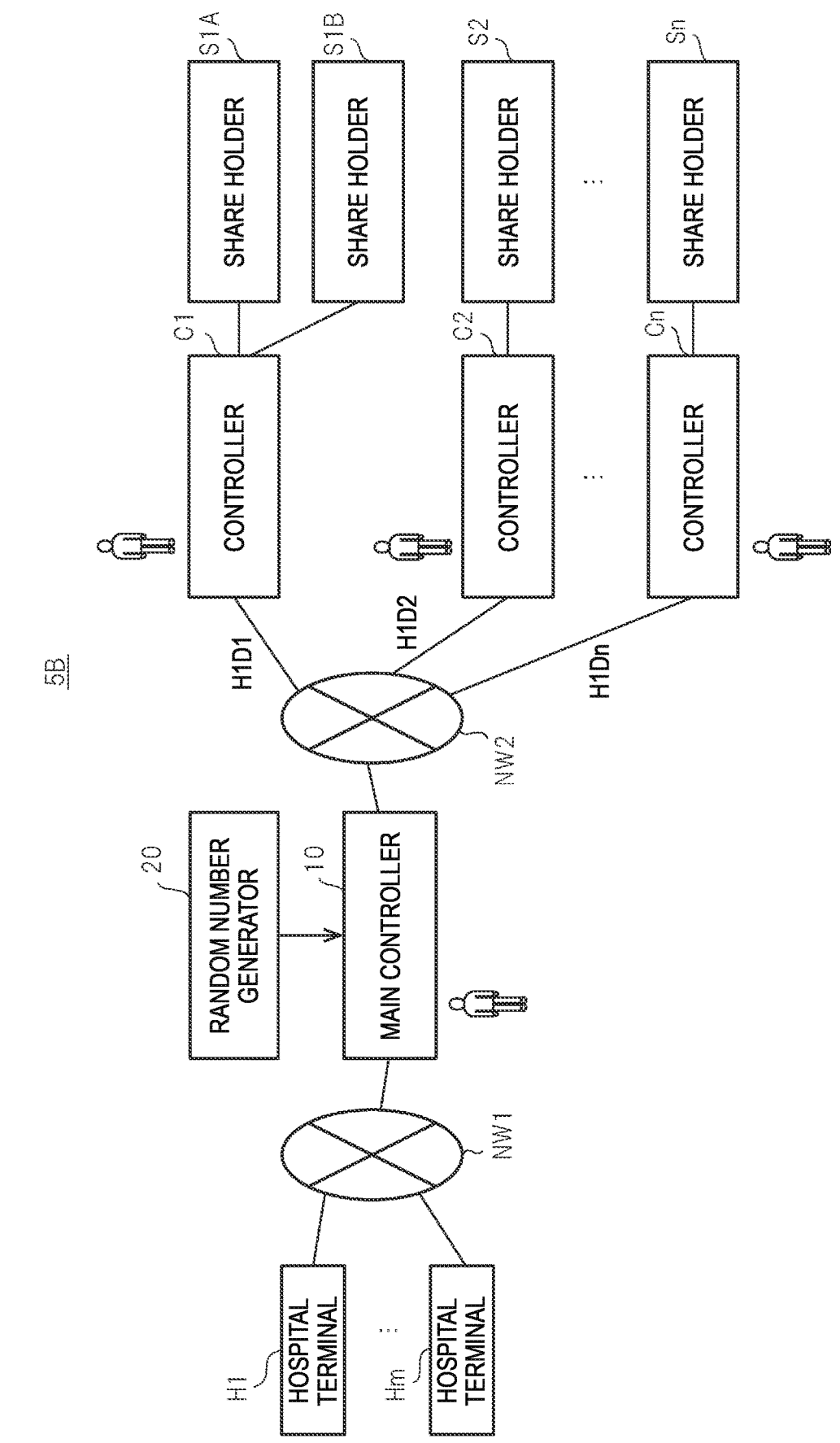
FIG. 8 is a diagram illustrating a system configuration example of a secret sharing system according to Modification 2 of Embodiment 1.

FIG. 8 is a diagram illustrating a configuration example of a secret sharing storage system 5B according to Modification 2 of Embodiment 1. In the secret sharing storage system 5B, the same components as in the secret sharing storage system 5A according to Modification 1 of Embodiment 1 are denoted by the same reference numerals, and the descriptions thereof are simplified or omitted.

According to Modification 2 of Embodiment 1, two share holders S1A and S1B are connected to one controller (for example, the controller C1). Accordingly, the total number of the controllers is less than the total number of the share holders. The controller C1 stores the distributed data received by the own controller and the substantial distributed information generated to correspond to the distributed data in an associated manner in the two share holders S1A and S1B, respectively.

Also in Modification 2 of Embodiment 1, in the same manner as in Modification 1 of Embodiment 1, the manager of each of the controllers C1 to Cn only possesses the authentication information for accessing the share holder corresponding to the own controller. Accordingly, with the secret sharing storage system 5B, the manager of the main controller 10 cannot directly access the share holders S1 to Sn to acquire distributed data.

Here, a case where the controller C1 is communicably connected to the two share holders S1A and S1B is described, but at least one of the other controllers C2 to Cn may be communicably connected to the plurality of share holders.

From the above, in the secret sharing storage system 5B, at least one controller (for example, the controller C1) among the n controllers C1 to Cn is communicably connected to the plurality of share holders S1A and S1B. The controller C1 stores the distributed data received by the own controller and the substantial distributed information generated to correspond to the distributed data in the plurality of share holders S1A and S1B in an associated manner. Accordingly, with the secret sharing storage system 5B, two or more share holders can be connected to one controller. Accordingly, a backup for storing the distributed data and the substantial distributed information in case one of the plurality of share holders fails can be appropriately built.

Modification 3 of Embodiment 1

In Modification 2 of Embodiment, only one main controller 10 is disposed. Therefore, when it is required to execute either of the distributed processing or the restoration processing of the hospital data, if the main controller 10 malfunctions due to a disaster, a failure, or the like, the distributed processing or the restoration processing of the hospital data cannot be executed appropriately. According to Modification 3 of Embodiment 1, an example in which another main controller that executes either of the distributed processing or the restoration processing in substitution is disposed when the main controller 10 falls into a malfunction or detects a sign thereof is described.

Figure 9:
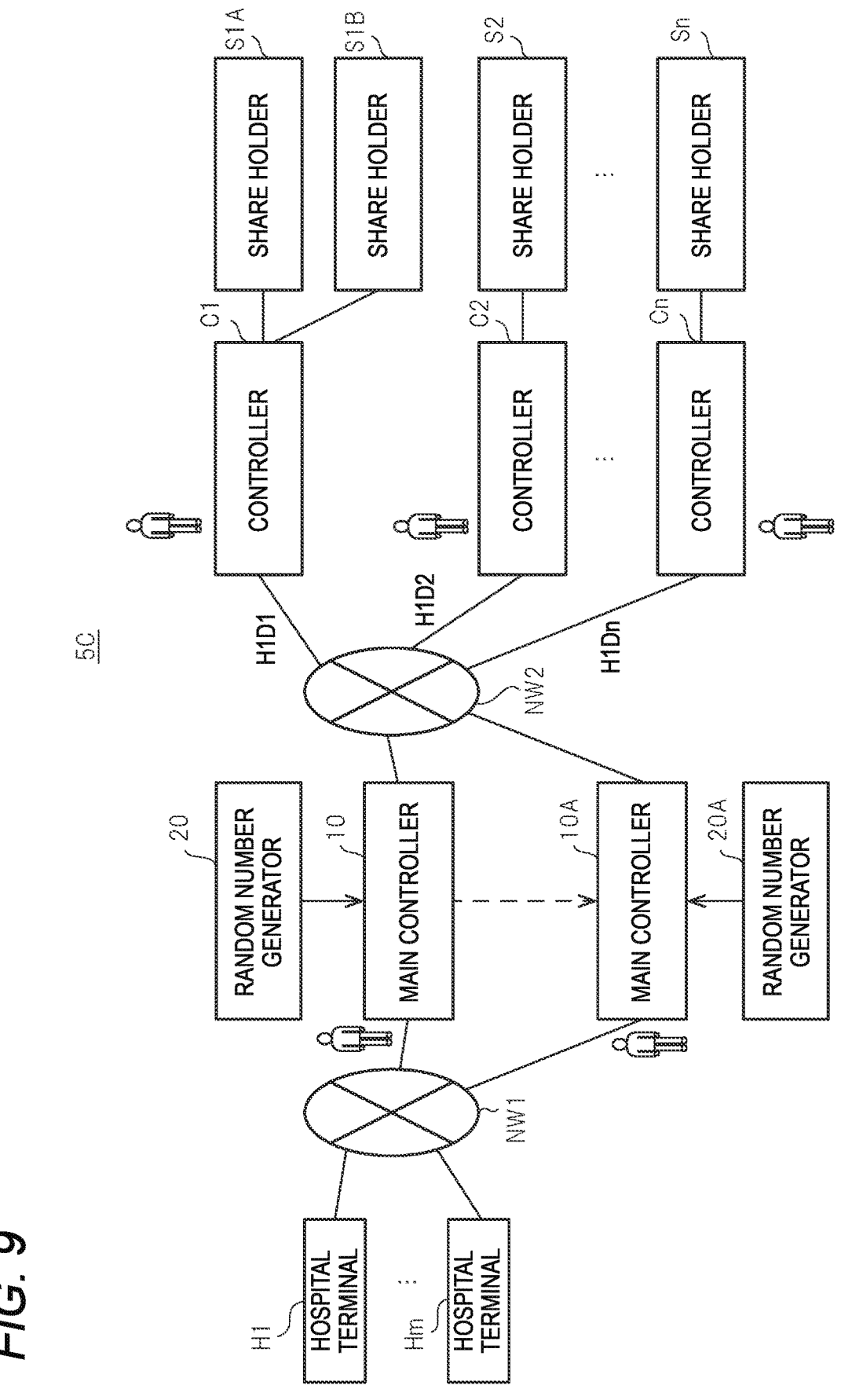
FIG. 9 is a diagram illustrating a system configuration example of a secret sharing system according to Modification 3 of Embodiment 1.

FIG. 9 is a diagram illustrating a configuration example of a secret sharing storage system 5C according to Modification 3 of Embodiment 1. In the secret sharing storage system 5C, the same components as in the secret sharing storage system 5B according to Modification 2 of Embodiment 1 are denoted by the same reference numerals, and the descriptions thereof are simplified or omitted.

In the secret sharing storage system 5C, differently from the main controller 10, a main controller 10A for a backup is disposed. The main controller 10 and the main controller 10A may be arranged to be geographically distant from each other so that malfunctions occur at the same time due to the generation of a disaster or may be arranged to be close to each other.

The main controller 10A as an example of the second main controller has the same configuration as the main controller 10, and thus specific description of the internal configuration of the main controller 10A is omitted. In the same manner as the main controller 10, the main controller 10A is connected to a random number generator 20A, and acquires a physical random number generated by the random number generator 20A. In the same manner as the random number generator 20, the random number generator 20A is preferably a physical random number generator but may be configured with a pseudo-random number generator. The main controller 10A is connected to the hospital terminals H1 to Hm via the network NW1 and is connected to the controllers C1 to Cn via the network NW2.

In the secret sharing storage system 5C, the main controller 10 monitors the life and death of the own device. For example, due to the generation of the disaster, the main controller 10 can detect the malfunction or a sign thereof. In case of the detection thereof, the main controller 10 sends the logical distributed information generated by the main controller 10 and an authority delegation notification of the distributed processing and the restoration processing to the main controller 10A disposed for backup.

If the logical distributed information and the authority delegation notification transmitted from the main controller 10 is received, the main controller 10A executes and continues the processing (for example, the distributed processing and the restoration processing) of the main controller 10 in substitution according to the authority delegation notification. The main controller 10A is not connected to the main controller 10 and may independently operate without the instruction such as the authority delegation notification from the main controller 10.

Instead of the main controller 10 monitoring the life and death of the own device, the main controller 10A may monitor the life and death of the main controller 10. An external PC (not illustrated) or a mobile terminal (not illustrated) may monitor the life and death of the main controller 10.

In this manner, in Modification 3 of Embodiment 1, for example, during a disaster or the like, the main controller 10 falls into a malfunction, the main controller 10A for backup operates in substitution. Accordingly, the robustness of the secret sharing storage system 5C improves. In the secret sharing storage system 5C, without providing the random number generator 20A, the main controller 10A may acquire the physical random number from the random number generator 20 if the main controller 10A can be connected to the random number generator 20 connected to the main controller 10. Accordingly, in the secret sharing storage system 5C, the main controller 10A is resultantly added, but the increase in the number of the installed random number generators can be avoided. Therefore, the cost increase can be suppressed. The main controller for backup is not limited to the one main controller 10A, and a plurality of main controllers may be provided.

From the above, the secret sharing storage system 5C further includes the main controller 10A communicably connected to at least one of the hospital terminals H1 to Hm, the n share holders S1 to Sn, the random number generator 20A, and the main controller 10. If a malfunction of the own device is detected, the main controller 10 sends the logical distributed information and the authority delegation notification of the distributed processing and the restoration processing to the main controller 10A. If the logical distributed information and the authority delegation notification are received from the main controller 10, the main controller 10A executes the distributed processing and the restoration processing of the hospital data in substitution for the main controller 10. Accordingly, also when the main controller 10 falls into a malfunction or detects a sign thereof, owing to the main controller 10A, the distributed processing and the restoration processing of the hospital data are not interrupted, and the secure storage of the distributed data based on the hospital data and the restoration of the hospital data as required can be continued.

Embodiment 2

In Embodiment 1 or various modifications thereof as described above, in the data communication between the hospital terminal (for example, the hospital terminal H1) and the main controller 10, it is mainly assumed that plain text data is sent and received. In Embodiment 2, an example in which hospital data is encrypted prior to the communication with the hospital terminals H1 to Hm, the main controller 10, and the controllers C1 to Cn is described. Therefore, the main controller 10 receives hospital data encrypted by the hospital terminal and executes the distributed processing on the encrypted hospital data.

Figure 10:
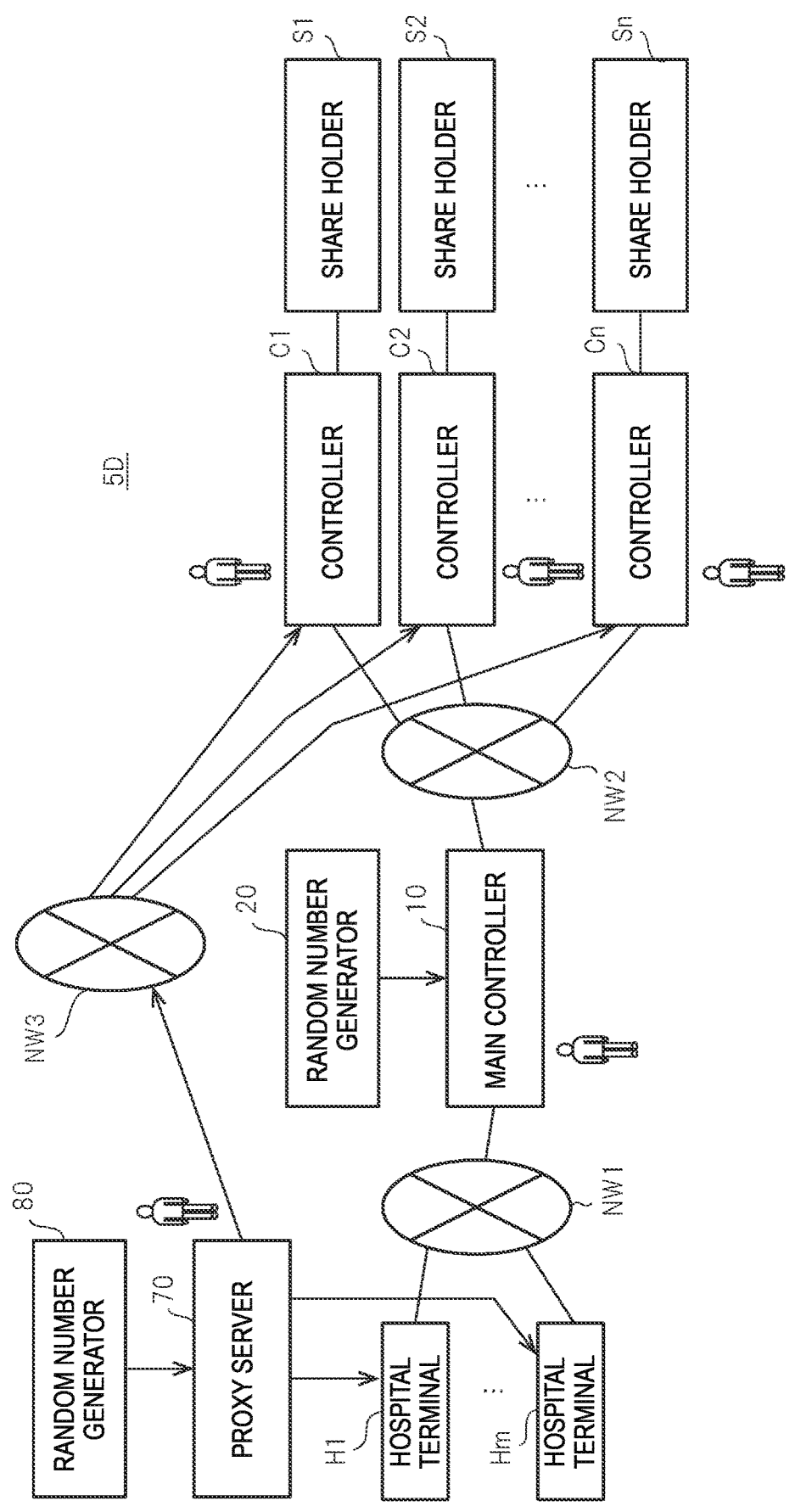
FIG. 10 is a diagram of a system configuration example of a secret sharing system according to Embodiment 2.

FIG. 10 is a diagram illustrating a configuration example of a secret sharing storage system 5D according to Embodiment 2. In the secret sharing storage system 5D, the same components as in the secret sharing storage system 5 according to Embodiment 1 are denoted by the same reference numerals, and the descriptions thereof are simplified or omitted.

The secret sharing storage system 5D has a configuration further including a proxy server 70 and a random number generator 80 in addition to the configuration of the secret sharing storage system 5A according to Modification 1 of Embodiment 1. The proxy server 70 and the controllers C1 to Cn are connected to a network NW3. The network NW3 may be the same network as the networks NW1 and NW2 or may be a different network. Specifically, the network NW3 may be, for example, a wide area network such as the Internet, may be a private network such as a Virtual Private Network (VPN) that virtually connects the proxy server 70 to the controllers C1 to Cn, or may be a dedicated line. In FIG. 10, though not illustrated, the proxy server 70 and the hospital terminals H1 to Hm may be communicably connected via a network such as the network NW3.

The random number generator 80 as an example of a second physical random number generator is a random number generator that generates a physically fluctuating value (in other words, a value that is difficult for a malicious third party to easily guess) as random number data, in the same manner as the random number generator 20. Specifically, the random number generator 80 generates the physical random number (for example, a common key for encryption and decryption) used for the communication between the hospital terminals H1 to Hm, the main controller 10, and the controllers C1 to Cn. Instead of the physical random number, a pseudo-random number may be used. The physical random number generated by the random number generator 80 is different from the physical random number (that is, the physical random number generated by the random number generator 20) used for generating the distributed data.

The proxy server 70 as an example of a communication management server stores the physical random number (an example of the second physical random number) generated by the random number generator 80 in a recording device 73 as stream cipher information. The proxy server 70 transmits the physical random number positioned as the common key used for the encryption or decryption of the communication between the hospital terminals H1 to Hm, the main controller 10, and the controllers C1 to Cn to the hospital terminal H1. The hospital terminal H1 stores the common key transmitted from the proxy server 70 to the memory in the hospital terminal H1. The proxy server 70 transmits the common key to the controllers C1 to Cn via the network NW3. The controllers C1 to Cn store the common key received from the proxy server 70 to each of the recording devices 53 in the own controllers. As described above, the same common key transmitted (distributed) from a proxy server 70A is held in the hospital terminal H1 and the controllers C1 to Cn.

Figure 11:
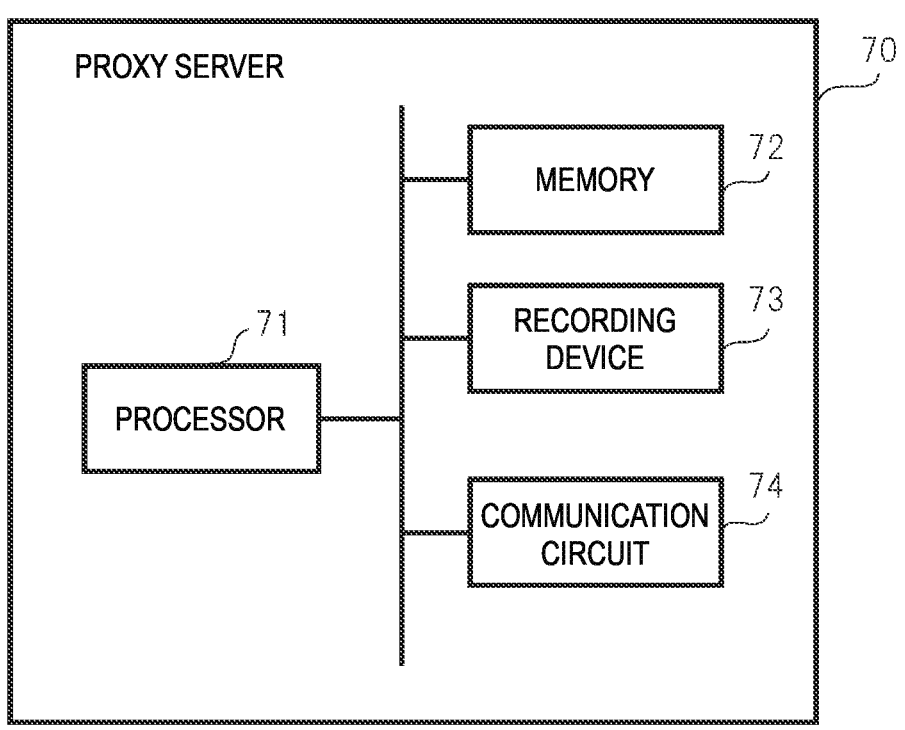
FIG. 11 is a block diagram illustrating a hardware configuration example of a proxy server.

FIG. 11 is a block diagram illustrating a hardware configuration example of the proxy server 70. The proxy server 70 has a configuration at least including a processor 71, a memory 72, the recording device 73, and a communication circuit 74.

The processor 71 is configured, for example, by using CPU, DSP, or FPGA, and operates according to the program and data stored in the memory 72 in advance in cooperation with the memory 72. The processor 71 acquires the physical random number (common key) transmitted from the random number generator 80 via the communication circuit 74. The processor 71 transmits the common key to the hospital terminal H1 and the controllers C1 to Cn via the communication circuit 74.

The memory 72 is configured, for example, with a RAM and a ROM and temporarily holds the program and the data required during the execution of the operation of the proxy server 70 and further the data or the information generated during the operation. The RAM is, for example, a work memory used during the operation of the proxy server 70. The ROM, for example, stores and holds the program and the data for controlling the proxy server 70, in advance.

The recording device 73 is, for example, configured by using an HDD or an SSD and stores the physical random number generated by the random number generator 80.

The communication circuit 74 is configured by using a circuit that communicates with various devices communicably connected to the proxy server 70. The communication circuit 74 performs data communication with the plurality of hospital terminals H1 to Hm. The communication circuit 74 performs data communication with the plurality of controllers C1 to Cn via the network NW3. The proxy server 70 and the random number generator 80 may be connected to each other by wire or wirelessly.

The hospital terminal (for example, the hospital terminal H1) encrypts hospital data OD that is the original data by using a common key transmitted from the proxy server 70 and transmits the encrypted hospital data E(OD) to the main controller 10 via the network NW1. In the above description, when the hospital data OD that is the original data is encrypted, the encrypted hospital data is denoted by E(OD) for convenience.

The main controller 10 receives the hospital data E(OD) encrypted by the hospital terminal (for example, the hospital terminal H1) from the hospital terminal H1 and performs the distributed processing of the encrypted hospital data E(OD) by using the physical random number generated by the random number generator 20. The main controller 10 transmits the plurality of pieces of encrypted distributed data E(ODH1) to E(ODHn) generated by the distributed processing respectively to the corresponding controllers C1 to Cn via the network NW2.

Subsequently, the distributed processing and the restoration processing of the secret sharing storage system 5D according to Embodiment 2 are described.

Figure 12:
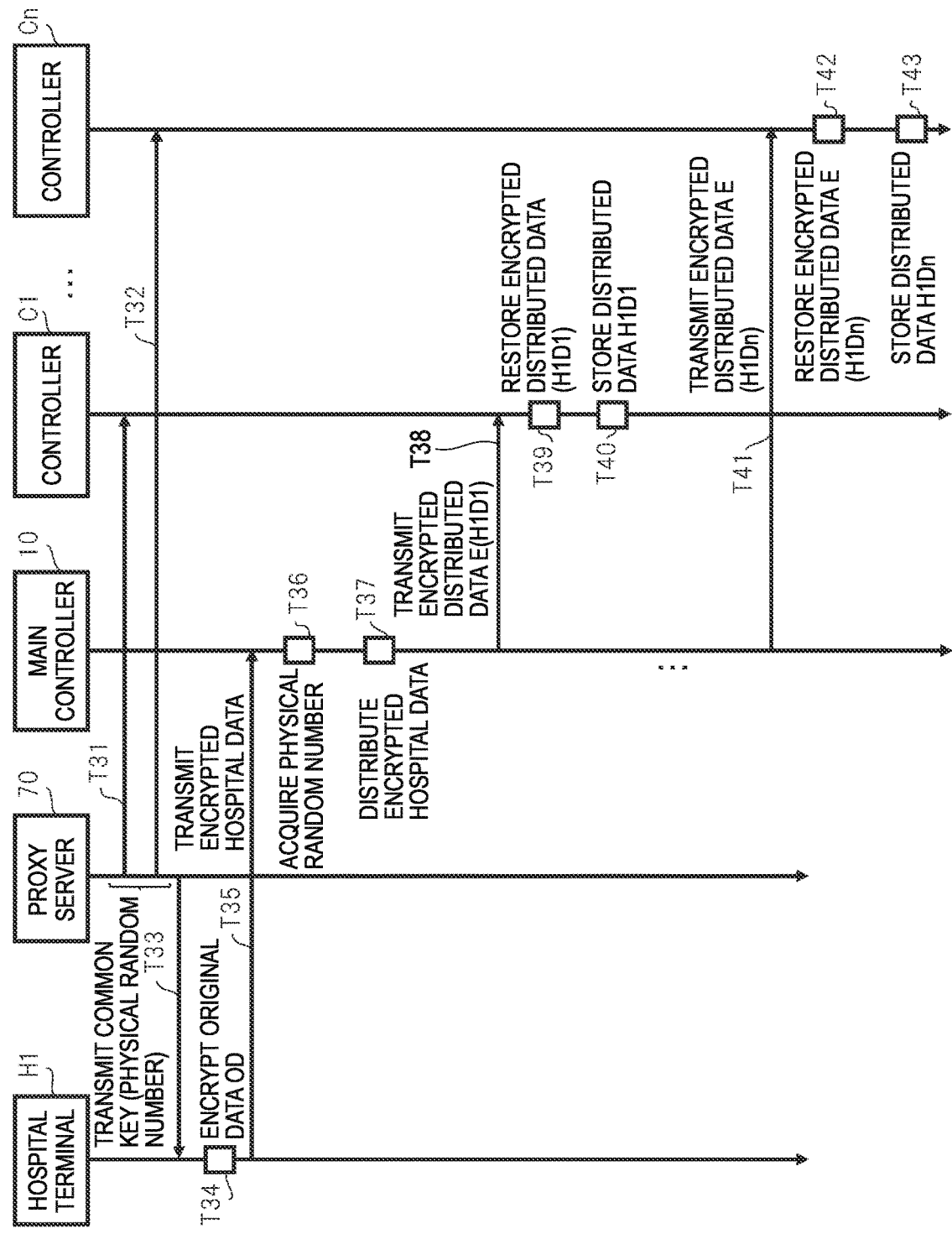
FIG. 12 is a sequence diagram illustrating an operation procedure example of the distributed processing.

FIG. 12 is a sequence diagram illustrating a procedure of the distributed processing. In the description of FIG. 12, the hospital terminal H1 as an example of the hospital terminal is exemplified.

In FIG. 12, in the secret sharing storage system 5D, prior to the execution of the distributed processing, first, the proxy server 70 acquires the physical random number generated by the random number generator 80 as the stream cipher information and transmits the physical random number to the controllers C1 to Cn and the hospital terminal H1 as the common key (T31, T32, and T33).

The controllers C1 to Cn store the common key received from the proxy server 70 in the recording devices 53, respectively.

The hospital terminal H1 stores the common key received from the proxy server 70 in the memory 12 or the recording device 13. The hospital terminal H1 encrypts original data OD (for example, the hospital data) with the common key (T34). The hospital terminal H1 transmits the encrypted hospital data E(OD) to the main controller 10 as an example of the encrypted original data (T35).

For example, when the encrypted hospital data E(OD) is received, the main controller 10 acquires the physical random number generated by the random number generator 20 and stores the physical random number in the recording device 13 (T36). The main controller 10 may temporarily store the acquired physical random number in the memory 12 without storing the acquired physical random number in the recording device 13 and may delete the physical random number after the execution of the distributed processing of Step T37. The main controller 10 executes the distributed processing of the encrypted hospital data E(OD) by using this physical random number and generates the set of the plurality of (for example, n) pieces of encrypted distributed data E(H1D1) to E(H1Dn) identical to the number of the arranged controllers C1 to Cn and the distributed information corresponding to the encrypted distributed data (T37). The encrypted distributed data E(H1D1) to E(H1Dn) are examples of the encrypted distributed data. After the distributed processing of Step T37 is executed, the main controller 10 may delete the encrypted hospital data E(OD).

The main controller 10 transmits the set of the encrypted distributed data E(H1D1) and the corresponding distributed information to the controller C1 (T38). The controller C1 reads the common key stored in the recording device 53 in Step T31 and decrypts the encrypted distributed data E(H1D1) by using this common key to obtain the distributed data H1D1 that is the plain text data (T39). The controller C1 stores the set of the distributed data H1D1 obtained by decryption and the corresponding distributed information in the corresponding share holder S1 (T40).

In the same manner, the main controller 10 executes processing the same as Steps T38 to T40 on the other controllers and transmits the set of the encrypted distributed data E(H1Dn) and the corresponding distributed information to the controller Cn (T41). The controller Cn reads the common key stored in the recording device 53 stored in Step T32 and decrypts the encrypted distributed data E(H1Dn) by using this common key to obtain the distributed data H1Dn that is the plain text data (T42). The controller Cn stores the set of the distributed data H1Dn obtained by decryption and the corresponding distributed information in the corresponding share holder Sn (T43).

In this manner, when executing the distributed processing, the controllers C1 to Cn decrypt the distributed data E(H1D1) to E(H1Dn) encrypted with the common key received from the proxy server 70 to obtain the distributed data H1D1 to H1Dn, respectively. The controllers C1 to Cn store the set of the distributed data H1D1 to H1Dn obtained by decryption and the corresponding distributed information in the corresponding share holders S1 to Sn, respectively. Accordingly, the sets of the distributed data H1D1 to H1Dn that is the plain text data and the corresponding distributed information are stored in the share holders S1 to Sn, respectively.

Figure 13:
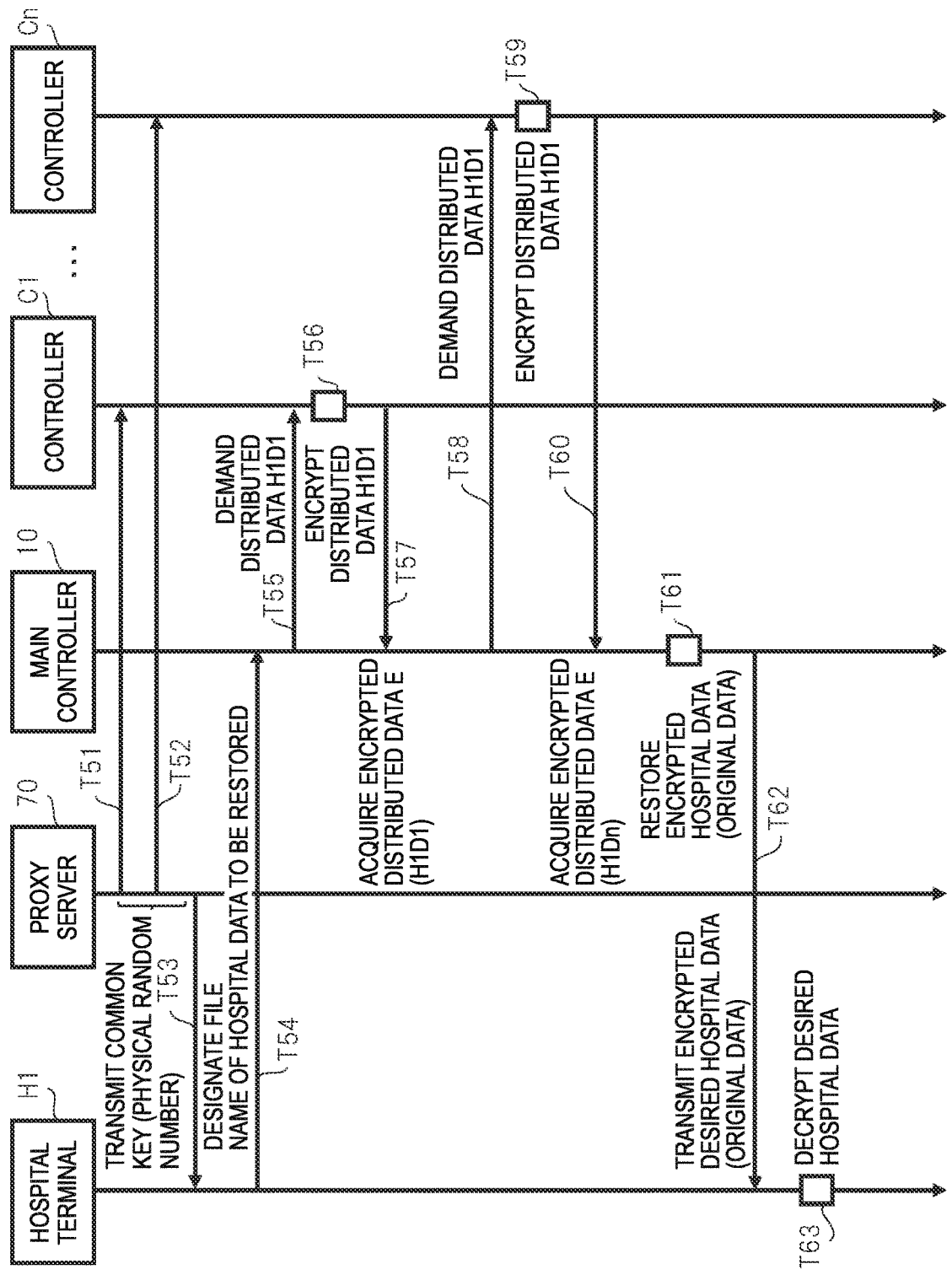
FIG. 13 is a sequence diagram illustrating an operation procedure example of the restoration processing.

FIG. 13 is a sequence diagram illustrating an operation procedure example of the restoration processing. In the description of FIG. 13, the hospital terminal H1 is provided as an example of the hospital terminal.

In FIG. 13, in the secret sharing storage system 5D, prior to the execution of the restoration processing, first, the proxy server 70 acquires the physical random number generated by the random number generator 80 as the stream cipher information and transmits the physical random number to the controllers C1 to Cn and the hospital terminal H1 as the common key (T51, T52, and T53).

The controllers C1 to Cn store the common key received from the proxy server 70 to the recording devices 53, respectively.

The hospital terminal H1 stores the common key received from the proxy server 70 to the memory 12 or the recording device 13. In addition, during the distributed processing and during the restoration processing, different common keys may be used, or the same common key may be used. When the same common key is used, Steps T51 to T53 can be omitted.

When requesting (demanding) the restoration processing of the hospital data OD (an example of the original data) from the main controller 10, the hospital terminal H1 designates the file name of the hospital data to be a target of the restoration processing (T54).

The main controller 10 transmits the acquisition demand of the distributed data generated to correspond to the file name based on the file name designated by the hospital terminal H1 to the controller C1 (T55). The controller C1 reads the set of the distributed data H1D1 stored in the share holder S1 corresponding to the own controller and the corresponding distributed information according to this acquisition demand. The controller C1 reads the common key stored in the recording device 53 in Step T51 and encrypts the distributed data H1D1 by using this common key to obtain the encrypted distributed data E(H1D1) (T56). The controller C1 transmits the set of the encrypted distributed data E(H1D1) and the corresponding distributed information to the main controller 10 (T57). The main controller 10 acquires the set of the encrypted distributed data E(H1D1) and the corresponding distributed information.

In the same manner, the main controller 10 transmits the acquisition demand of the distributed data generated based on the file name designated by the hospital terminal H1 to correspond to this file name to the controller Cn (T58). The controller Cn reads the set of the distributed data H1Dn stored in the share holder Sn to correspond to the own controller and the corresponding distributed information according to this acquisition demand. The controller Cn reads the common key stored in the recording device 53 in Step T52 and encrypts the distributed data H1Dn by using this common key to obtain the encrypted distributed data E(H1Dn) (T59). The controller Cn transmits the set of the encrypted distributed data E(H1Dn) and the corresponding distributed information to the main controller 10 (T60). The main controller 10 acquires the set of the encrypted distributed data E(H1Dn) and the corresponding distributed information.

In this manner, in Steps T55 to T60, the main controller 10 receives the encrypted distributed data E(H1D1) to E(H1Dn) and the corresponding distributed information from all of the controllers C1 to Cn, respectively. The main controller 10 performs the restoration processing based on the encrypted distributed data E(H1D1) to E(H1Dn) and the corresponding distributed information to obtain the encrypted hospital data E(OD) (T61). When the physical random number used during the distributed processing is stored in the recording device 13, the main controller 10 may perform the restoration processing by using this physical random number. The main controller 10 transmits the encrypted hospital data E(OD) to the hospital terminal H1 (T62). The hospital terminal H1 decrypts the encrypted hospital data E(OD) by using this common key stored in the memory 12 or the recording device 13 to acquire the hospital data OD (the desired original data) (T63).

From the above, the secret sharing storage system 5D of Embodiment 2 further includes the proxy server 70 communicably connected to the random number generator 80. The proxy server 70 sends the common key generated by the random number generator 80 to the n controllers C1 to Cn and the hospital terminal (for example, the hospital terminal H1). The main controller 10 receives the encrypted hospital data E(OD) by using the common key from the hospital terminal H1. The main controller 10 performs the distributed processing on the encrypted hospital data E(OD) by using the physical random number, generates n pieces of the encrypted distributed data E(H1D1) to E(H1Dn), and sends the encrypted distributed data to the n controllers C1 to Cn, respectively. If the encrypted distributed data E(H1D1) to E(H1Dn) corresponding to the own devices (the own controllers) is received from the main controller 10, respectively, the n controllers C1 to Cn decrypt the received distributed data E(H1D1) to E(H1Dn), respectively, by using the common key. The n controllers C1 to Cn store the distributed data H1D1 to H1Dn obtained by this decryption to the share holders S1 to Sn corresponding to the own device, respectively.

Accordingly, in the secret sharing storage system 5D, when the main controller 10 executes the distributed processing, the hospital data received from the hospital terminal is already encrypted, and thus the content of the hospital data can be concealed from the manager of the main controller 10. In other words, the original data (hospital data) to be concealed is encrypted by the common key (that is, the common key that the main controller 10 cannot know) obtained from the proxy server 70 different from the main controller 10, and thus the hospital terminal can transmit data to the main controller 10 without worrying about the leakage of the hospital data by the manager of the main controller 10.

According to the restore indication from the hospital terminal H1, the main controller 10 sends the acquisition demand of n pieces of the distributed data to the n controllers C1 to Cn, respectively. According to the acquisition demand, the n controllers C1 to Cn encrypt the distributed data H1D1 to H1Dn stored in the share holders S1 to Sn, respectively, by using the common key, generate the encrypted distributed data E(H1D1) to E(H1Dn), respectively, and send the data to the main controller 10. The main controller 10 restores the encrypted hospital data E(OD) from the n encrypted distributed data E(H1D1) to E(H1Dn) received from the n controllers C1 to Cn, respectively, by using the physical random number and sends the data to the hospital terminal H1.

Accordingly, when the main controller 10 performs the restoration processing, the main controller 10 receives the encrypted distributed data from the controllers C1 to Cn, and thus the content of the hospital data that is the plain text data cannot be known even if the restoration processing is executed. That is, the main controller 10 can only acquire encrypted data, and thus the manager of the main controller 10 cannot know confidential information. Accordingly, the leakage of the confidential information by the manager of the main controller can be excluded.

Embodiment 3

In Embodiment 2, since the stream cipher is used, the physical random number (that is, the common key to be used in the stream cipher) generated by the random number generator 80 is transmitted as the same common key to the hospital terminal (for example, the hospital terminal H1) and the controllers C1 to Cn from the proxy server 70. In Embodiment 3, it is assumed to use another encryption method, the proxy server 70A performs the distributed processing on the common key obtained by using the random number generator 80 and transmits the common key (that is, the distributed data obtained by executing the distributed processing on the physical random number from the random number generator 80) subjected to the distributed processing to the controllers C1 to Cn so that the entire common key is not transmitted without change, in order to suppress the leakage of the common key as much as possible. Here, the cipher method is not particularly limited.

FIG. 14 is a diagram illustrating a configuration example of a secret sharing storage system 5E according to Embodiment 3. In the secret sharing storage system 5E, the same components as in the secret sharing storage system 5D according to Embodiment 2 are denoted by the same reference numerals, the descriptions thereof are simplified or omitted, and different contents are described.

In the secret sharing storage system 5E, the proxy server 70A stores the physical random number generated by the random number generator 80 in the recording device 73 as the cipher information. The proxy server 70 executes the distributed processing on this physical random number and transmits the distributed common key to the controllers C1 to Cn via the network NW3. The controllers C1 to Cn store the distributed common keys to the recording devices 53 of the own controllers which are received from the proxy server 70A. The distributed common key is obtained by executing the distributed processing on the physical random number generated as the cipher information and is different for each of the controllers C1 to Cn. Meanwhile, the proxy server 70A does not execute the distributed processing on the physical random number generated by the random number generator 80 and transmits the common key to the hospital terminal H1 without change.

Figure 15:
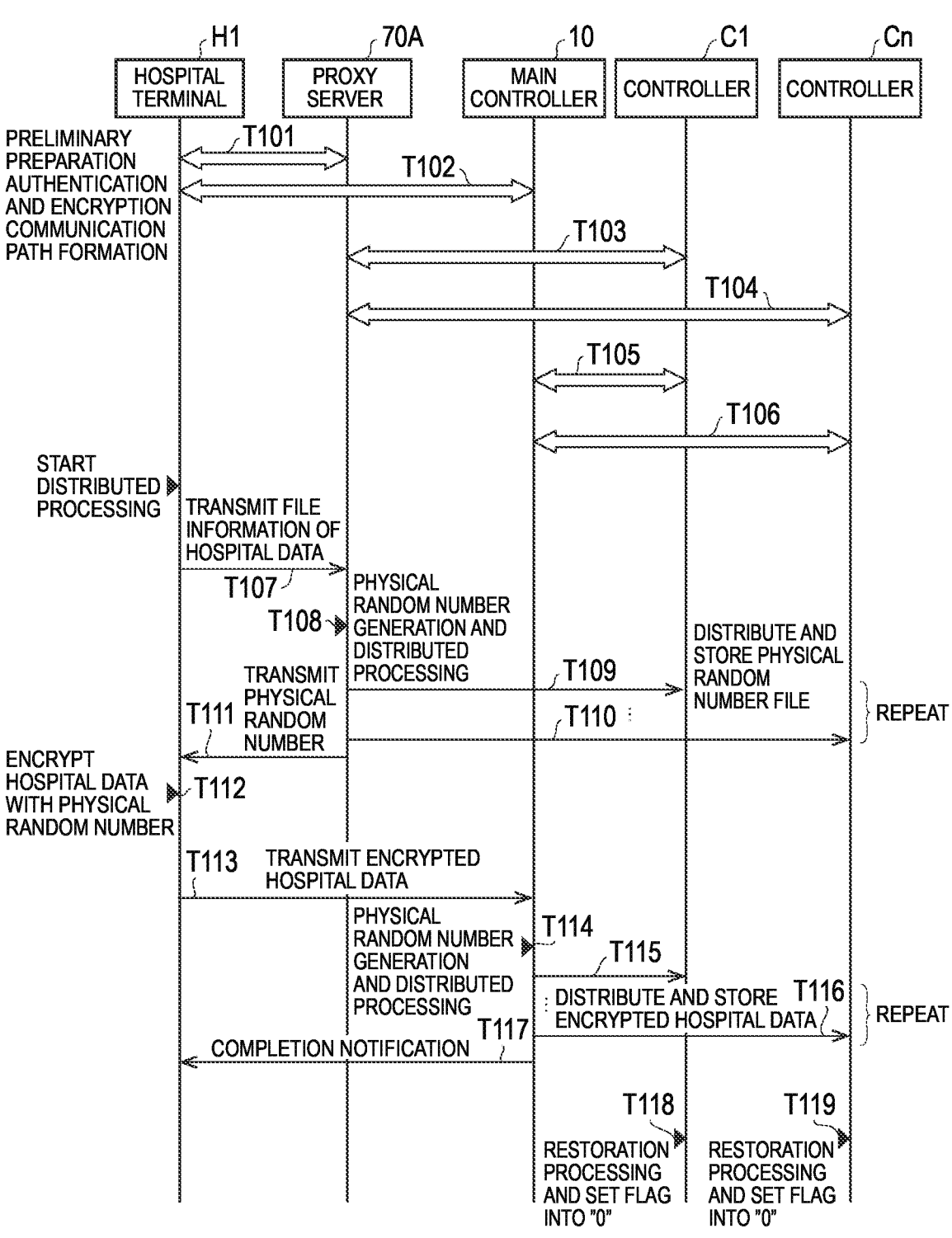
FIG. 15 is a sequence diagram illustrating an operation procedure example of the distributed processing.

FIG. 15 is a sequence diagram illustrating the operation procedure example of the distributed processing. In the description of FIG. 15, the hospital terminal H1 is provided as an example of the hospital terminal.

In FIG. 15, the secret sharing storage system 5E executes the preliminary preparation before the distributed processing starts. In the preliminary preparation, first, the well-known device authentication and the communication path formation are performed between the hospital terminal H1 and the proxy server 70A (T101). For the device authentication, for example, a two-way public key cryptosystem is used. Negotiation is performed between the hospital terminal H1 and the proxy server 70A, and a communication path that can perform the data communication is formed. In this communication path, for example, the VPN is used.

In the same manner, the well-known device authentication and the communication path formation are performed between the hospital terminal H1 and the main controller 10 (T102). The well-known device authentication and the communication path formation are performed between the proxy server 70A and the controller C1 (T103). The device authentication and the communication path formation are performed between the proxy server 70A and controllers subsequent to the controller C2 in the same manner, and finally the well-known device authentication and the communication path formation are performed between the proxy server 70A and the controller Cn (T104).

In the same manner, the well-known device authentication and the communication path formation between the main controller 10 and the controller C1 are performed (T105). The device authentication and communication path formation are performed also between the main controller 10 and controllers subsequent to the controller C2 in the same manner, and finally the well-known device authentication and the communication path formation between the main controller 10 and the controller Cn are performed (T106).

When the distributed processing starts, the hospital terminal H1 transmits the file information (including a file name and a data amount) of the hospital data OD that is the original data to the proxy server 70A (T107). If the proxy server 70A receives the file information of the hospital data OD from the hospital terminal H1, the physical random number generated by the random number generator 80 based on the file information is acquired and stored (T108). For example, if the Burnham cipher is used as an example of the cipher algorithm, the random number generator 80 generates the physical random number having the same size length (number of digits) of the hospital data as the size length. The proxy server 70A performs the distributed processing on the physical random number and generates the plurality of (for example, n) distributed common keys.

The proxy server 70A transmits n distributed common keys (hereinafter, referred to as "physical random number files") to the controllers C1 to Cn in an associated manner in a one-to-one correspondence (T109 and T110). For example, the proxy server 70A transmits the first physical random number file to the first controller and transmits the second physical random number file to the second controller, and transmits the n-th physical random number file to the n-th controller in the same manner. The controllers C1 to Cn transmit and store any one of the n distributed common keys received from the proxy server 70A to the share holders S1 to Sn corresponding to the own controllers, respectively. The header information of this distributed common key includes a file name of the hospital data OD of the hospital terminal H1. Accordingly, the distributed data of the hospital data OD described below and the distributed common key are associated with each other by the same file name (specifically, the file name of the hospital data OD).

Here, when the distributed common keys (the physical random number files) received from the proxy server 70A are stored, each of the controllers C1 to Cn sets a value of a state flag indicating an unused state as a usage state of the distributed common key (physical random number file) to "1". As described below, the value of this state flag decrypts the distributed data (encrypted distributed data) of the encrypted hospital data with the distributed common key (physical random number file) and is changed to "0" when the distributed data that is the plain text data is stored in each of the share holders S1 to Sn. That is, depending on whether the value of the state flag is "1" or "0", it is identified whether the distributed common key (physical random numberber file) is unused or used. Accordingly, when a series of the processing is interrupted before the distributed data of the hospital data is stored, a distributed common key (physical random number file) of which a value of a state flag is "1" can be erased, and it is possible to avoid unnecessarily leaving distributed random number data that is not used for storing the distributed data of the hospital data. Therefore, the memory usage efficiency can be increased. When there is no physical random number file (distributed random number data) of which the value of the state flag is "1", the controllers C1 to Cn can reject the reception of the encrypted distributed data and can detect an error.

After distributed common keys are transmitted to the controllers C1 to Cn, the proxy server 70A transmits the common keys to the hospital terminal H1 (T111). The hospital terminal H1 stores the distributed common keys in the memory 12 or the recording device 13. The proxy server 70A may acquire and generate the physical random number from the random number generator 80 in the stage of the preliminary preparation.

The hospital terminal H1 encrypts the hospital data OD by using the common keys stored in the memory 12 or the recording device 13 to obtain the encrypted hospital data E(OD) (T112). The hospital terminal H1 transmits the encrypted hospital data E(OD) to the main controller 10 (T113). The main controller 10 receives the encrypted hospital data E(OD).

The main controller 10 acquires the physical random number generated by the random number generator 20, for example, when the encrypted hospital data E(OD) is received, and stores the physical random number in the recording device 13. After the distributed processing is executed, the main controller 10 may delete the physical random number. The main controller 10 may acquire the physical random number generated in this stage and may acquire the physical random number in the preliminary preparation.

The main controller 10 executes the distributed processing by using this physical random number and generates the sets of the plurality of pieces of encrypted distributed data E(H1D1) to E(H1Dn) and the distributed information corresponding to the encrypted distributed data (T114). The main controller 10 transmits the sets of the plurality of pieces of encrypted distributed data E(H1D1) to E(H1Dn) and the corresponding distributed information to the corresponding controllers C1 to Cn, respectively (T115 and T116).

After the sets of the plurality of pieces of encrypted distributed data E(H1D1) to E(H1Dn) and the corresponding distributed information are received, the controllers C1 to Cn perform decryption by using the distributed common keys stored in the recording devices 53, respectively, acquire the distributed data H1D1 to H1Dn that is the plain text data, and store the distributed data in the corresponding share holders S1 to Sn, respectively. Here, the encrypted distributed data and the distributed common keys are associated with each other by the file names, as described above.

If the distributed processing is finished, the main controller 10 transmits the completion notification indicating that the distributed processing of the hospital data OD is completed to the hospital terminal H1 (T117). The controllers C1 to Cn change the values of the state flags into "0" that is the value indicating that the distributed common keys are used (T118 and T119). The processing of Step T117 and Steps T118 and T119 may be performed in an opposite order.

Figure 16:
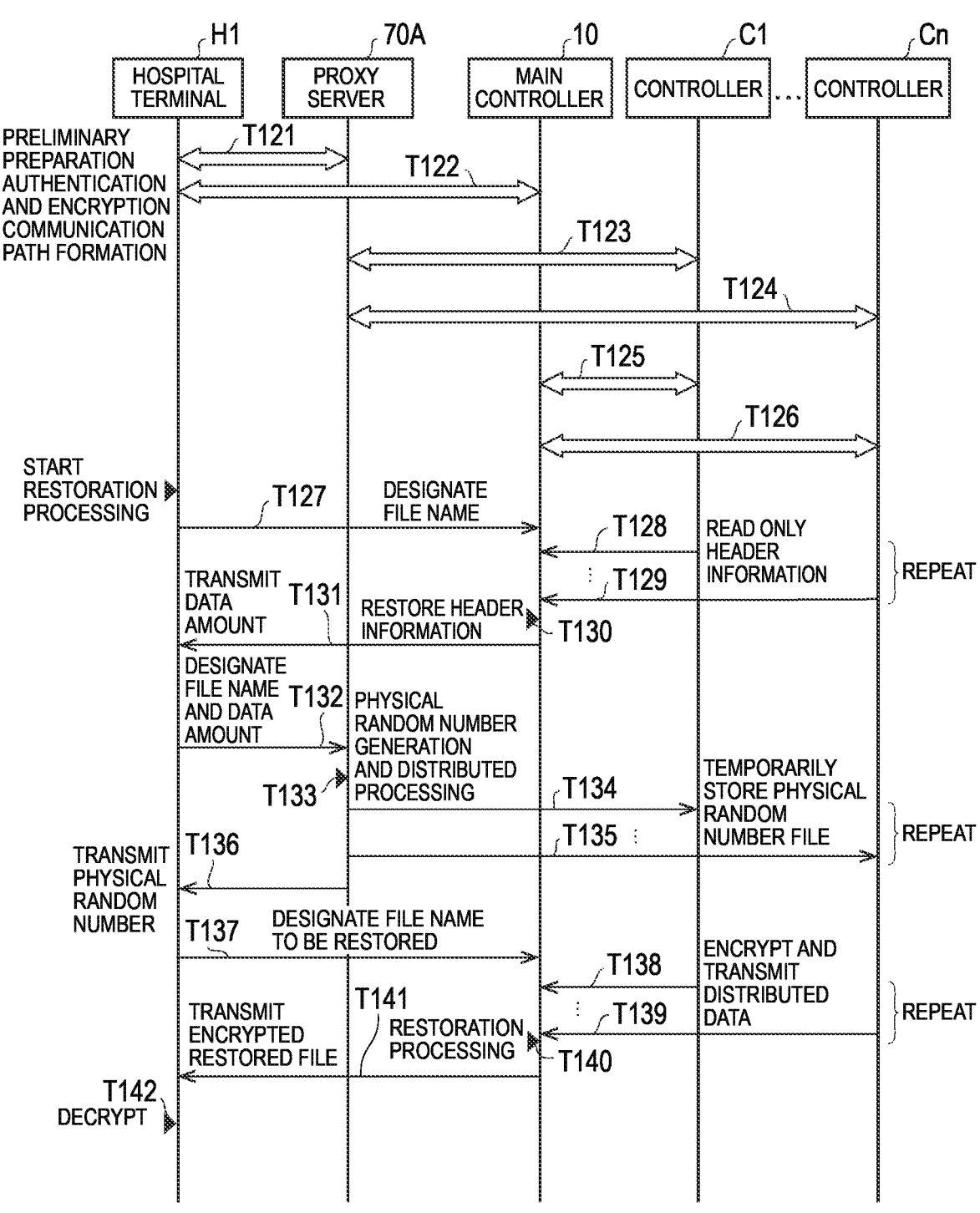
FIG. 16 is a sequence diagram illustrating an operation procedure example of the restoration processing.

FIG. 16 is a sequence diagram illustrating an operation procedure example of the restoration processing. In the description of FIG. 16, the hospital terminal H1 is provided as an example of the hospital terminal.

In FIG. 16, the restoration processing is performed in any period of time after the distributed processing illustrated in FIG. 15 is executed (for example, after half a year). The secret sharing storage system 5E executes the preliminary preparation in the same manner as before the start of the distributed processing before the restoration processing starts (T121 to T126). The preliminary preparation is the same as the distributed processing, and thus the description thereof is omitted.

When the restoration processing starts, the hospital terminal H1 designates file names of desired original data (for example, the hospital data OD) for which the restoration processing is requested according to the operation of the user and notifies the file names to the main controller 10 (T127). The file names may be designated by using plain text data.

The main controller 10 calls the controllers C1 to Cn only for header information of the distributed data H1D1 to H1Dn corresponding to the file names designated by the hospital terminal H1 (T128 and T129). The controllers C1 to Cn read the sets of the header information of the distributed data H1D1 to H1Dn which is respectively stored in the share holders S1 to Sn and different from each other and corresponding distributed information and transmit the sets to the main controller 10. The main controller 10 restores the header information of the hospital data OD based on the sets of the header information and the corresponding distributed information (T130). The main controller 10 acquires the file sizes (data amounts) included in the restored header information and transmits the information of the data amount in the hospital terminal H1 (T131).

The hospital terminal H1 designates the file names and the data amounts of the hospital data OD to be restored and notifies the file name and the data amount to the proxy server 70A (T132). If the file names and the data amounts of the hospital data OD are received from the hospital terminal H1, the proxy server 70A acquires the physical random number generated by the random number generator 80 based on the file information (T133). By performing the designation by using the file name and the data amount, the correspondence between the physical random number and the hospital data and the data size of the physical random number become clear. The proxy server 70A performs the distributed processing of the physical random number generated by the random number generator 80 and stores distributed common keys in the recording device 73.

The proxy server 70A transmits the distributed common keys to the controllers C1 to Cn, respectively (T134 and T135). The controllers C1 to Cn temporarily store the distributed common keys in the corresponding share holders S1 to Sn, respectively. The header information of the distributed common keys includes file names of the hospital data OD of the hospital terminal H1. The proxy server 70A transmits the common keys to the hospital terminal H1 (T136). The hospital terminal H1 stores the common keys in the memory 12 or the recording device 13.

The hospital terminal H1 designates the file names of the hospital data OD to be restored and notifies the file names to the main controller 10 (T137). The main controller 10 transmits the acquisition demands of the distributed data to the controllers C1 to Cn, respectively. The controllers C1 to Cn read the sets of any of the distributed data H1D1 to H1Dn respectively stored in the corresponding share holders S1 to Sn and the corresponding distributed information according to these acquisition demands. The controllers C1 to Cn encrypt any of the corresponding distributed data H1D1 to H1Dn by using the distributed common keys stored in the recording devices 53 and obtain the encrypted distributed data E(H1D1) to E(H1Dn), respectively. The controllers C1 to Cn transmit the sets of the encrypted distributed data E(H1D1) to E(H1Dn) and the corresponding distributed information to the main controller 10 (T138 and T139).

If the sets of the encrypted distributed data and the corresponding distributed information are received respectively from the controllers C1 to Cn, the main controller 10 executes the restoration processing restoring the encrypted hospital data by using the distributed information corresponding to the encrypted distributed data. Accordingly, the main controller 10 can obtain the encrypted hospital data E(OD) (T140). The main controller 10 transmits the encrypted hospital data E(OD) obtained by the restoration to the hospital terminal H1 (T141).

The hospital terminal H1 decrypts the encrypted hospital data E(OD) by using the common keys stored in the memory 12 or the recording device 13 in Step T136 to obtain the hospital data OD (T142). The hospital terminal H1 can acquire the hospital data that is the plain text data.

In this manner, in the secret sharing storage system 5E according to Embodiment 3, the distributed common keys are given respectively to the controllers C1 to Cn, and thus the manager of each of the controllers C1 to Cn cannot know the distributed common keys stored in the other controllers. Accordingly, the leakage of the confidential information can be excluded by the manager of each controller, and thus a system with high security can be constructed. In the same manner as in Embodiment 2, when the distributed processing is performed, the hospital data received from the hospital terminal is encrypted. Therefore, the manager of the main controller 10 cannot know the content of the hospital data. The main controller 10 does not know which physical random number is used for which hospital data. In the same manner, when the restoration processing is performed, the manager of the main controller 10 receives the encrypted distributed data from the controllers C1 to Cn and thus cannot know the contents of the hospital data even if executing the restoration processing. That is, only the encrypted data is given to the main controller 10, and thus the manager of the main controller 10 cannot know the highly confidential hospital data in the format of the plain text data. Accordingly, the leakage of the confidential information can be excluded from the manager of the main controller 10.

(Data Structure Example)

Subsequently, structure examples of various kinds of data according to Embodiments 1 to 3 described above are described with reference to FIGS. 17, 18, and 19. In the descriptions of FIGS. 17 to 19, the number of the arranged controllers and share holders is set to "4" for easier understanding.

FIG. 17 is a table illustrating examples of the original data OD, a physical random number A, and distributed data ODD.

For example, the original data OD (for example, hospital data) is configured by combining eight pieces of original data OD1, original data OD2, . . . , and original data OD8.

In the same manner, the physical random number A is generated by the random number generator 20 for the distributed processing, and is configured, for example, by combining eight of a random number A1, a random number A2, . . . , and a random number A8. As illustrated in FIG. 17, for example, when the Burnham cipher is used, the size length of the original data OD and the size length of the physical random number A are the same. Therefore, the original data OD1, the original data OD2, . . . , and the original data OD8 have the same size lengths as the random number A1, the random number A2, . . . , and the random number A8, respectively.

Here, by the main controller 10, when the distributed processing is executed by using the original data OD1 to OD8 and the corresponding random number A1 to A8, the distributed data ODD configured with four pieces of distributed data OD1D, OD2D, OD3D, and OD4D illustrated in FIG. 17 can be obtained.

The distributed data OD1D is obtained by executing exclusive OR (that is, XOR processing) on the original data OD1, the original data OD5, the random number A1, and the random number A5 and generated as "the original data OD1 XOR the original data OD5 XOR the random number A1 XOR the random number A5". The configuration example of the distributed data OD1D is not limited to the example illustrated in FIG. 17. Accordingly, the distributed data OD1D is stored, for example, in the share holder S1 as the corresponding share holder.

In the same manner, the original data OD2, the original data OD6, the random number A2, and the random number A6 are subjected to the exclusive OR (that is, XOR processing) to generate "the original data OD2 XOR the original data OD6 XOR the random number A2 XOR the random number A6". The configuration example of the distributed data OD2D is not limited to the example illustrated in FIG. 17. Accordingly, the distributed data OD2D is stored, for example, in the share holder S2, as the corresponding share holder.

In the same manner, the original data OD3, the original data OD7, the random number A3, and the random number A7 are subjected to the exclusive OR (that is, XOR processing), to generate "the original data OD3 XOR the original data OD7 XOR the random number A3 XOR the random number A7". The configuration example of the distributed data OD3D is not limited to the example illustrated in FIG. 17. Accordingly, the distributed data OD3D is stored, for example, in the share holder S3 as the corresponding share holder.

In the same manner, the original data OD4, the original data OD8, the random number A4, and the random number A8 are subjected to the exclusive OR (that is, XOR processing), to generate "the original data OD4 XOR the original data OD8 XOR the random number A4 XOR the random number A8". The configuration example of the distributed data OD4D is not limited to the example illustrated in FIG. 17. Accordingly, the distributed data OD4D is stored, for example, in the share holder S4 as the corresponding share holder.

FIG. 18 is a table illustrating examples of a physical random number B and encrypted original data (hospital data) E(OD).

The physical random number B is generated by the random number generator 80 for encryption or decryption of the communication, and is configured, for example, by combining eight of a random number B1, a random number B2, . . . , and the random number B8. As illustrated in FIG. 18, for example, when the Burnham cipher is used, the size length of the original data OD is the same as the size length of the physical random number B. Therefore, the original data OD1, the original data OD2, . . . , and the original data OD8 have the same size lengths as the random number B1, the random number B2, . . . , and the random number B8, respectively.

Here, when the encryption processing is executed by using the original data OD1 to OD8 and the corresponding random numbers B1 to B8 by the hospital terminal (for example, the hospital terminal H1), the encrypted hospital data E(OD) configured with eight ciphers 1 to 8 illustrated in FIG. 18 can be obtained.

The cipher 1 is generated as "the random number B1 XOR the original data OD1" by subjecting the original data OD1 and the random number B1 to the exclusive OR (that is, XOR processing). The configuration example of the cipher 1 is not limited to the example illustrated in FIG. 18.

In the same manner, the cipher 2 is generated as "the random number B2 XOR the original data OD2" by subjecting the original data OD2 and the random number B2 to the exclusive OR (that is, XOR processing). The configuration example of the cipher 2 is not limited to the example illustrated in FIG. 18.

In the same manner, the cipher 3 is generated as "the random number B3 XOR the original data OD3" by subjecting the original data OD3 and the random number B3 to the exclusive OR (that is, XOR processing). The configuration example of the cipher 3 is not limited to the example illustrated in FIG. 18.

In the same manner, the cipher 4 is generated as "the random number B4 XOR the original data OD4" by subjecting the exclusive OR (that is, XOR processing) to the original data OD4 and the random number B4. The configuration example of the cipher 4 is not limited to the example of FIG. 18.

In the same manner, the cipher 5 is generated as "the random number B5 XOR the original data OD5" by subjecting the original data OD5 and the random number B5 to the exclusive OR (that is, XOR processing). The configuration example of the cipher 5 is not limited to the example illustrated in FIG. 18.

In the same manner, the cipher 6 is generated as "the random number B6 XOR the original data OD6" by subjecting the original data OD6 and the random number B6 to the exclusive OR (that is, XOR processing). The configuration example of the cipher 6 is not limited to the example illustrated in FIG. 18.

In the same manner, the cipher 7 is generated as "the random number B7 XOR the original data OD7" by subjecting the original data OD7 and the random number B7 to the exclusive OR (that is, XOR processing). The configuration example of the cipher 7 is not limited to the example illustrated in FIG. 18.

In the same manner, the cipher 8 is generated as "the random number B8 XOR the original data OD8" by subjecting the original data OD8 and the random number B8 to the exclusive OR (that is, XOR processing). The configuration example of the cipher 2 is not limited to the example illustrated in FIG. 18.

In Embodiments 2 or 3, encrypted original data (hospital data) E(OD) is generated in the hospital terminal (for example, the hospital terminal H1) and is transmitted from the hospital terminal H1 to the main controller 10. The main controller 10 executes the distributed processing on the encrypted original data (hospital data) E(OD) by using the physical random number A generated by the random number generator 20 to generate four pieces of encrypted distributed data (a cipher 1D, a cipher 2D, a cipher 3D, and a cipher 4D) illustrated in FIG. 19.

FIG. 19 is a table illustrating an example of the distributed encrypted distributed data E(ODD) generated by subjecting the encrypted original data (hospital data) E(OD) to the distributed processing.

The encrypted distributed data E(ODD) is configured, for example, with four of the cipher 1D, the cipher 2D, the cipher 3D, and the cipher 4D. The ciphers 1D to 4D represent distributed encrypted original data.

In Embodiment 3, the main controller 10 executes the distributed processing on the encrypted original data (hospital data) E(OD) by using the physical random number A generated by the random number generator 20 according to an algorithm for generating the distributed data (distributed processing method) illustrated in FIG. 17. Accordingly, for example, four pieces of the distributed encrypted original data (specifically, the ciphers 1D to 4D) are generated.

The cipher 1D is generated as "the cipher 1 XOR the cipher 5 XOR the random number B1 XOR the random number B5" by subjecting the cipher 1, the cipher 5, the random number A1, and the random number A5 to the exclusive OR (that is, XOR processing). The configuration example of the cipher 1D is not limited to the example illustrated in FIG. 19.

The cipher 2D is generated as "the cipher 2 XOR the cipher 6 XOR the random number B2 XOR the random number B6" by subjecting the cipher 2, the cipher 6, the random number A2, and the random number A6 to the exclusive OR (that is, XOR processing). The configuration example of the cipher 2D is not limited to the example illustrated in FIG. 19.

The cipher 3D is generated as "the cipher 3 XOR the cipher 7 XOR the random number B3 XOR the random number B7" by subjecting the cipher 3, the cipher 7, the random number A3, and the random number A7 to the exclusive OR (that is, XOR processing). The configuration example of the cipher 3D is not limited to the example illustrated in FIG. 19.

The cipher 4D is generated as "the cipher 4 XOR the cipher 8 XOR the random number B4 XOR the random number B8" by subjecting the cipher 4, the cipher 8, the random number A4, and the random number A8 to the exclusive OR (that is, XOR processing). The configuration example of the cipher 4D is not limited to the example illustrated in FIG. 19.

Accordingly, for example, the distributed encrypted original data (the cipher 1D, the cipher 2D, the cipher 3D, and the cipher 4D) sent to four controllers is obtained by subjecting the distributed random number data that is "the distributed data generated by the distributed processing of the physical random number B" ("the random number B1 XOR the random number B5", "the random number B2 XOR the random number B6", "the random number B3 XOR the random number B7", and "the random number B4 XOR the random number B8") and distributed data OD1D, OD2D, OD3D, and OD4D that is "distributed data generated by the distributed processing of the original data OD" to the exclusive OR (XOR processing).

Accordingly, the four controllers can generate distributed data OD1D, OD2D, OD3D, and OD4D that is the plain text data by using the random numbers ("the random number B1 XOR the random number B5", "the random number B2 XOR the random number B6", "the random number B3 XOR the random number B7", and "the random number B4 XOR the random number B8") that are received from the proxy server 70A and subjected to the distributed processing and the encrypted distributed data (the cipher 1D, the cipher 2D, the cipher 3D, and the cipher 4D) that is received from the main controller 10. The four controllers store the distributed data OD1D to OD4D that is plain text data in any one of the four corresponding share holders, respectively.

From the above, the secret sharing storage system 5E includes the n controllers C1 to Cn provided to correspond to the n share holders S1 to Sn, the main controller 10 that is communicably connected to the n controllers C1 to Cn, at least one of the hospital terminals H1 to Hn, and the random number generator 20, and the proxy server 70A that is communicably connected to the n controllers C1 to Cn, the hospital terminals H1 to Hn, and the random number generator 80. When the file names and the data amounts of the hospital data (examples of bibliographic information of the original data) are received from the hospital terminal (for example, the hospital terminal H1), the proxy server 70A executes the distributed processing on the common keys (second physical random numbers) generated by the random number generator 80 and generates the n common keys (distributed random number data) subjected to the distributed processing. The proxy server 70A sends the n common keys subjected to the distributed processing respectively to the n corresponding controllers C1 to Cn and also sends the common keys to the hospital terminal H1. If the encrypted hospital data E(OD) is received from the hospital terminal H1 by using the common keys, the main controller 10 acquires the physical random numbers generated by the random number generator 20, executes the distributed processing on the encrypted hospital data E(OD) by using this physical random number, and generates the n pieces of the encrypted distributed data E(H1D1) to E(H1Dn)(encrypted distributed data). The main controller 10 sends the n pieces of encrypted distributed data E(H1D1) to E(H1Dn) respectively to the n corresponding controllers C1 to Cn.

Accordingly, in the secret sharing storage system 5E, the proxy server 70A can use the physical random numbers obtained by the random number generator 80 as the common keys, execute the distributed processing on the common keys, and securely give the common keys subjected to the distributed processing to the controllers C1 to Cn, respectively, without being known by the manager of the main controller 10. Therefore, according to the secret sharing storage system 5E, when highly concealed hospital data that is held by the hospital terminal (for example, the hospital terminal H1) is subjected to the distributed processing, the hospital data is encrypted by the common keys that are known only to the proxy server 70A, the hospital terminal, and the respective controllers and then is given to the main controller 10. Therefore, it is possible to prevent the content of the hospital data from being known by the manager of the main controller 10.

If the encrypted distributed data E(H1D1) to E(H1Dn) (specifically, any one piece thereof) corresponding to the own devices (the own controllers) is received from the main controller 10, the n controllers C1 to Cn decrypt the encrypted distributed data by using the common keys subjected to the distributed processing which correspond to the own devices and store the distributed data obtained by the decryption in the corresponding share holders S1 to Sn. Therefore, according to the secret sharing storage system 5E, when the distributed data is stored in the share holders S1 to Sn, even when any one piece of the encrypted distributed data is decrypted, the corresponding common key subjected to the distributed processing can be easily specified.

The proxy server 70A performs distributed processing on the common key generated by the random number generator 80 and generates n common keys (distributed random number data) subjected to the distributed processing according to the restore indication including the data amount (size amount information) of the hospital data from the hospital terminal H1. The proxy server 70A sends the n common keys subjected to the distributed processing respectively to the n corresponding controllers C1 to Cn, respectively, and also sends the common keys to the hospital terminal H1. The n controllers C1 to Cn encrypt the distributed data H1D1 to H1Dn respectively received from the share holders S1 to Sn corresponding to the own devices by using the common keys subjected to the distributed processing received by the own devices from the proxy server 70A, generate the encrypted distributed data E(H1D1) to E(H1Dn), and send the encrypted distributed data to the main controller 10. The main controller 10 restores the encrypted hospital data E(OD) from the encrypted distributed data E(H1D1) to E(H1Dn) received respectively from the n controllers C1 to Cn and sends the encrypted hospital data to the hospital terminal H1. Accordingly, the proxy server 70A performs the distributed processing on the common keys obtained by using the random number generator 80 and gives the common keys subjected to the distributed processing to the controllers. Therefore, in case of the restoration processing, the common keys can be securely given to the controllers.

The main controller 10 receives the file names (an example of the bibliographic information) of the distributed data received by the n controllers C1 to Cn from the corresponding share holders S1 to Sn according to the restore indication from the hospital terminal H1, from the n controllers C1 to Cn. The main controller 10 restores the bibliographic information of the hospital data and extracts the data amount (size amount information) of the hospital data from the bibliographic information of the hospital data. Accordingly, even when the distributed data stored in the share holders S1 to Sn is restored, the corresponding common keys subjected to the distributed processing can be easily specified to encrypt the distributed data.

When the corresponding common key subjected to the distributed processing is stored, each of the n controllers C1 to Cn sets a value of a state flag indicating a usage state of this common key (distributed random number data) subjected to the distributed processing to "1". Thereafter, the n controllers C1 to Cn decrypt the n pieces of encrypted distributed data E(H1D1) to E(H1Dn) by using the common keys subjected to the distributed processing, store the decrypted distributed data respectively in the corresponding share holders S1 to Sn, and then set the information indicating usage completion, that is, the value of the state flag to "0". Accordingly, when a series of the processing is interrupted before the distributed data of the hospital data is stored, the common key subjected to the distributed processing of which a value of a state flag is "1" is erased, and it is possible to avoid unnecessarily leaving the common key subjected to the distributed processing that is not used for the storage. That is, the memory usage efficiency can be increased. When there is no common key subjected to the distributed processing of which the value of the state flag is "1", the controllers C1 to Cn can reject the reception of the encrypted distributed data and thus an error can be generated quickly.

In the above, various embodiments are described with reference to the drawings, but it is obvious that the present disclosure is not limited to such examples. It is clear that various changes, modifications, substitutions, additions, deletions, and equality can be conceived by a person skilled in the art within the scope of the claims and are naturally understood to belong to the technical scope of the present disclosure. Each component in the various embodiments described above may be arbitrarily combined without departing from the gist of the invention.

For example, in the above embodiment, a hospital terminal is exemplified as a user, but the present disclosure is not limited to this and can be applied to organizations that handle hospital data, such as public institutions or private research facilities.

This application is based on Japanese patent application filed on Feb. 22, 2019 (Japanese Patent Application No. 2019-031022), the contents of which are incorporated herein by reference.

INDUSTRIAL APPLICABILITY

The present disclosure is useful for a secure secret sharing storage system that suppresses a cost increase accompanied by installation of a physical random number generator that generates a physical random number used during secret sharing regardless of the number of users who require the secret sharing and that uses a cloud service that supports realization of secure storage of original data to be concealed.

REFERENCE SIGNS LIST

5: secret sharing storage system
10: main controller
11, 41, 51, 71: processor
12, 42, 52, 72: memory
13, 43, 53, 73: recording device
14, 44, 54, 74: communication circuit
20: random number generator
70: proxy server
C1, Cn: controller
H1, Hm: hospital terminal
S1, Sn: share holder

The invention claimed is:

1. A secret sharing storage system, comprising:
at least one user terminal;
n units of storage devices, n being an integer of 2 or more, each storage device of the n units of storage devices including a first processor, a first memory, a first recording device, and a first communication circuit;
n units of controllers that correspond respectively to the n units of storage devices, each controller of the n units of controllers including a second processor, a second memory, a second recording device, and a second communication circuit; and
a main controller that is communicably connected to a random number generator and to the n units of controllers,
wherein the main controller
    acquires a random number generated by the random number generator in a case of receiving original data sent from the user terminal,
    executes distributed processing on the original data by using the random number to generate n pieces of distributed data,
    generates logical distributed information relating to generation of the n pieces of distributed data,
    transmits the n pieces of distributed data and the logical distributed information to the n units of controllers in a first associated manner, and
    deletes the random number and the original data after transmitting the n pieces of distributed data and the logical distributed information to the n units of controllers in the first associated manner,
wherein the n units of controllers
    receive the n pieces of distributed data and the logical distributed information from the main controller, generate substantial distributed information, including (i) information relating to the n pieces of distributed data received by the n units of controllers and (ii) biographical information of the n pieces of distributed data, by using the logical distributed information, and store the substantial distributed information and the n pieces of distributed data received by the n units of controllers in corresponding ones of the n units of storage devices in a second associated manner, wherein the n units of controllers are interposed respectively between the main controller and the n units of storage devices in a one-to-one correspondence with the n units of storage devices, with the n units of controllers being physically separate from the n units of storage devices, and wherein the n units of controllers transmit the substantial distributed information and the n pieces of distributed data received by the n units of controllers to the corresponding ones of the n units of storage devices in the second associated manner, whereby the main controller can only indirectly receive the n pieces of distributed data via each of the n units of controllers and cannot directly acquire the n pieces of distributed data from the n units of storage devices.

2. The secret sharing storage system according to claim 1, wherein the main controller acquires the n pieces of distributed data stored respectively in the n units of storage devices in response to a restore indication from the user terminal, restores the original data from the n pieces of distributed data, and sends the original data to the user terminal.

3. The secret sharing storage system according to claim 1, further comprising:

a second main controller that is communicably connected to the at least one user terminal, the n units of controllers, the random number generator, and the main controller, wherein the main controller sends the logical distributed information and an authority delegation notification to the second main controller, in a case that a malfunction of the main controller is detected; and wherein the second main controller executes distributed processing and restoration processing of the original data in substitution for the main controller in response to the logical distributed information and the authority delegation notification being received from the main controller.

4. The secret sharing storage system according to claim 1, further comprising:

a communication management server that is communicably connected to a second random number generator, wherein the communication management server sends a second random number generated by the second random number generator to the n units of controllers and the user terminal; and wherein the main controller receives encrypted original data from the user terminal, the encrypted original data being encrypted by the user terminal by using the second random number, and executes the distributed processing on the encrypted original data by using the random number, generates n pieces of encrypted distributed data, and sends the n pieces of encrypted distributed data to the n units of controllers; and wherein, in a case that the n units of controllers receives the encrypted distributed data from the main controller, the n units of controllers decrypt the encrypted distributed data by using the second random number and store distributed data obtained by decryption in the n units of storage devices corresponding to the n units of controllers.

5. The secret sharing storage system according to claim 4, wherein the main controller sends an acquisition demand of the n pieces of distributed data to the n units of controllers in response to a restore indication from the user terminal;

wherein the n units of controllers encrypt the n pieces of distributed data stored respectively in the n units of storage devices by using the second random number, generate encrypted distributed data, and send the encrypted distributed data to the main controller in response to the acquisition demand; and wherein the main controller restores the encrypted original data from the encrypted distributed data received from the n units of controllers by using the second random number and sends the encrypted original data to the user terminal.

6. A secret sharing storage method using a secret sharing storage system including a main controller that is communicably connected to at least one user terminal, n units of storage devices, n units of controllers that correspond respectively to the n units of storage devices and are communicably connected to the main controller, and a random number generator, n being an integer of 2 or more, the secret sharing storage method comprising:

acquiring, by the main controller, a random number generated by the random number generator, in a case that original data sent from the user terminal is received;

executing, by the main controller, distributed processing on the original data by using the random number to generate n pieces of distributed data;

generating, by the main controller, logical distributed information relating to generation of the n pieces of distributed data;

transmitting, by the main controller, the n pieces of distributed data and the logical distributed information to the n units of controllers in a first associated manner, each controller of the n units of controllers including a first processor, a first memory, a first recording device, and a first communication circuit;

deleting, by the main controller, the random number and the original data after transmitting the n pieces of distributed data and the logical distributed information to the n units of controllers in the first associated manner, receiving, by the n units of controllers via the first communication circuit, the n pieces of distributed data and the logical distributed information from the main controller, the n units of controllers being interposed respectively between the main controller and the n units of storage devices in a one-to-one correspondence with the n units of storage devices, with the n units of controllers being physically separate from the n units of storage devices;

generating substantial distributed information, including (i) information relating to the n pieces of distributed data received by the n units of controllers and (ii) biographical information of the n pieces of distributed data, by using the logical distributed information;

transmitting, by the n units of controllers, the substantial distributed information and the n pieces of distributed data received by the n units of controllers to corresponding ones of the n units of storage devices in a second associated manner, each storage device of the n units of storage devices including a second processor, a second memory, a second recording device, and a second communication circuit; and receiving and storing, by the n units of storage devices via the second communication circuit and the second recording device, the substantial distributed information and the n pieces of distributed data in the second associated manner, whereby the main controller can only indirectly receive the n pieces of distributed data via each of the n units of controllers and cannot directly acquire the n pieces of distributed data from the n units of storage devices.

* * * * *